(12) United States Patent
Jarrett et al.

(10) Patent No.: US 11,833,952 B2
(45) Date of Patent: Dec. 5, 2023

(54) HOIST FOR VEHICLE WITH INTERCHANGEABLE BODY

(71) Applicant: Deist Industries, Inc., Hadley, PA (US)

(72) Inventors: Brian L Jarrett, Waterford, PA (US); Andrew J. Schumacher, Cranberry Township, PA (US); Jeffrey M. Burns, Waterford, PA (US)

(73) Assignee: DEIST INDUSTRIES, INC., Hadley, PA (US)

(*) Notice: Subject to any disclaimer, the term of this patent is extended or adjusted under 35 U.S.C. 154(b) by 0 days.

(21) Appl. No.: 18/081,291

(22) Filed: Dec. 14, 2022

(65) Prior Publication Data

US 2023/0114428 A1    Apr. 13, 2023

Related U.S. Application Data

(63) Continuation of application No. 17/895,374, filed on Aug. 25, 2022, now abandoned, which is a continuation-in-part of application No. PCT/US2021/020281, filed on Mar. 1, 2021, which is a continuation of application No. 16/808,610, filed on Mar. 4, 2020, now Pat. No. 11,214,186.

(51) Int. Cl.
*B60P 1/28*   (2006.01)
*B60P 1/64*   (2006.01)
*B60P 1/16*   (2006.01)
*B60P 3/42*   (2006.01)

(52) U.S. Cl.
CPC .............. *B60P 1/6454* (2013.01); *B60P 1/16* (2013.01); *B60P 1/6409* (2013.01); *B60P 1/6427* (2013.01); *B60P 1/6481* (2013.01); *B60P 3/42* (2013.01); *B60P 1/28* (2013.01)

(58) Field of Classification Search
CPC .. B60P 3/42; B60P 1/28; B60P 1/6454; B60P 1/16; B60P 1/6409; B60P 1/427; B60P 1/6481; B60P 1/64; B60P 1/6427; B65G 67/30
USPC ............... 296/35.3, 11; 298/22 R, 22 J, 22 D
See application file for complete search history.

(56) References Cited

U.S. PATENT DOCUMENTS 100,296 A    3/1870  Jerome
126,926 A    5/1872  Brady
(Continued)

FOREIGN PATENT DOCUMENTS

EP           2946970 B1    7/2019
WO       WO2001038136 A1  5/2001

*Primary Examiner* — Hilary L Gutman
(74) *Attorney, Agent, or Firm* — Emerson, Thomson & Bennett, LLC; Roger D. Emerson

(57) ABSTRACT

A hoist for raising and mounting an interchangeable vehicle body onto a vehicle chassis. The hoist includes a hoist frame having a pivot end and an elevated end for slidably supporting the interchangeable body. A subframe with a bolt-on assembly is provided for fixedly connecting to the vehicle chassis. A linkage connects the hoist frame to the subframe. The linkage also includes a hinge joint member for raising the elevated end of the hoist frame. A hinge assembly pivotally connects to the pivot end of the hoist frame. The hinge assembly has a bolt-on mounting bracket for fixedly connecting to the vehicle chassis. A winch assembly is retained in the elevated end of the hoist frame and extending beyond the pivot end for raising the interchangeable body onto the hoist frame.

30 Claims, 34 Drawing Sheets

(56) References Cited

U.S. PATENT DOCUMENTS

| | | | |
|---|---|---|---|
| 278,971 A | 6/1883 | Kengel | |
| 475,085 A | 5/1892 | Jones | |
| 582,994 A | 5/1897 | Corthell | |
| 640,927 A | 1/1900 | Mitchell, Jr. | |
| 643,157 A | 2/1900 | Rakestraw | |
| 703,706 A | 7/1902 | Meyer | |
| 735,745 A | 8/1903 | Fredenburgh | |
| 4,015,879 A * | 4/1977 | Shonkwiler | B60P 1/6454 298/14 |
| 5,836,657 A * | 11/1998 | Tilley | B60P 1/28 410/82 |
| 6,789,829 B1 * | 9/2004 | Kapels | B62D 63/061 296/11 |
| 7,090,305 B2 * | 8/2006 | Thorvaldson, Sr. | B60P 1/28 298/1 A |
| 8,393,686 B2 | 3/2013 | Dunigan | |
| 11,214,186 B2 * | 1/2022 | Schumacher | B60P 1/6454 |
| 2020/0307435 A1 * | 10/2020 | Franiak | B62D 63/08 |

\* cited by examiner

HOIST FOR VEHICLE WITH INTERCHANGEABLE BODY

This application is a continuation of U.S. Ser. No. 17/895,374, filed Aug. 25, 2022, entitled HOIST FOR VEHICLE WITH INTERCHANGEABLE BODY, which claims the benefit of international application PCT/US2021/020281, entitled HOIST FOR VEHICLE WITH INTERCHANGEABLE BODY, filed Mar. 1, 2021, which further claims the benefit of U.S. Pat. No. 11,214,186, entitled HOIST FOR VEHICLE WITH INTERCHANGEABLE BODY, filed Mar. 4, 2020, which are fully incorporated herein by reference.

I. BACKGROUND

A. Technical Field

This invention pertains generally to the field of vehicles such as trucks that employ interchangeable bodies. In particular, the invention pertains to hoists that are used for raising and mounting an interchangeable vehicle body onto a vehicle chassis.

B. Description of Related Art

Vehicles such as trucks are known to have different types of bodies, including a flat bed, a dumping body, an enclosed freight body, etc. Trucks of the same class can have various different bodies mounted onto the same chassis. Typically, vehicles such as trucks have a dedicated body that is permanently mounted to a chassis. Such a truck is sold and used as one type of special purpose vehicle, for handling the special types of jobs associated with the dedicated body.

Vehicles with dedicated bodies are limited in use for only the types of special jobs that can be performed by that particular body. For example, a dump truck is only useful for dumping. Such vehicles can remain idle while their associated types of jobs are not being performed. A small business may not have the available resources to purchase and maintain a fleet of dedicated vehicles having different bodies. For this reason, vehicles having interchangeable bodies are known to have certain useful advantages. A truck using interchangeable bodies enables the same single vehicle to be converted and adapted for use with a variety of different jobs, without requiring a fleet of separate vehicles to be maintained.

Such vehicles with interchangeable bodies typically include a hoist for raising and mounting an interchangeable body onto a vehicle chassis. Such a common-type hoist 10 includes a movable hoist frame for supporting an interchangeable body, which is mounted to a subframe that is welded onto the vehicle chassis. In this manner, the subframe is maintained in a fixed position. The hoist frame can be selectively elevated and inclined in such a manner as to allow an interchangeable body to be slidably mounted upon the chassis.

Though there are benefits to using interchangeable bodies, vehicles with interchangeable bodies are also subject to certain drawbacks. Such a vehicle must be dedicated for the specific use of mounting interchangeable bodies, since a welded hoist often precludes conversion to another single use vehicle. It is thus difficult to convert the vehicle back to other uses besides mounting interchangeable bodies due to damage to the chassis from welding. Also, welding is typically outsourced to a professional welder rather than performed by on-site personnel.

Moreover, the hoist can become damaged from repeated mountings and remountings of different types of interchangeable bodies. Replacing a damaged hoist can be a time-consuming matter due in part to scheduling outsourced welding services, resulting in vehicle down time. And the chassis can be further damaged by repeated welding operations from repeated hoist replacements, which can shorten vehicle life or require additional vehicle servicing to repair or replace the chassis.

In addition, previous type welded hoist systems are specifically sized to only permit a single length of interchangeable body to be deployed. Moreover, in such welded hoist systems, the components for elevating the hoist frames are hard mounted at a fixed maximum angle, which reduces the usefulness of certain interchangeable body types for certain applications.

II. SUMMARY

Provided in this disclosure is a hoist system for raising and mounting an interchangeable vehicle body onto a vehicle chassis. The hoist includes a hoist frame having a pivot end and an elevated end for slidably supporting the interchangeable body. A subframe with a bolt-on assembly is provided for fixedly connecting to the vehicle chassis. A linkage connects the hoist frame to the subframe. The linkage also includes a hinge joint member for raising the elevated end of the hoist frame. A hinge assembly pivotally connects to the pivot end of the hoist frame. The hinge assembly has a bolt-on mounting bracket for fixedly connecting to the vehicle chassis. A winch assembly is retained in the elevated end of the hoist frame and extending to the pivot end for raising the interchangeable body onto the hoist frame.

The present hoist frame can include first and second parallel frame members, each extending along a longitudinal axis of the hoist frame between the elevated end and the pivot end, for supporting the interchangeable vehicle body. One or both of these parallel frame members can also include a body hold down bracket to enable different sized interchangeable vehicle bodies to be used on the hoist. Further, the body hold down bracket can support one or more greaseless slide pads formed of a low friction material to support the interchangeable vehicle body during movement along the hoist.

The parallel frame members of the present hoist frame can also include one or more greaseless slide strips, formed of a low friction material, and mounted along a side of the respective one of the first and second parallel frame members, for protecting against frictional damage. Additionally, the parallel frame members can also include one or more greaseless rollers, mounted at a pivot end of the respective parallel frame members, for facilitating mounting of the interchangeable vehicle body onto the hoist.

The present hoist system for raising and mounting an interchangeable vehicle body onto a vehicle chassis can also include a hydraulic cylinder, connected to the subframe, for displacing the linkage to raising the elevated end of the hoist frame. Additionally, a pump plate is connected to the subframe for supporting the hydraulic and electrical components that power the system. The frame of the present hoist system can also include a greaseless V-roller assembly for slidably supporting a cable of the winch assembly for raising the interchangeable body onto the hoist frame. Further, a winch plate can be provided in the elevated end of the hoist frame. The winch plate includes two perpendicular sides for connecting to two respective sides of the winch assembly, such that the winch plate supports the winch assembly in two separate planes.

In the present hoist system, the first and second parallel subframe members are each formed with a plurality of modular self-locating holes for engaging and supporting the linkage at a respective plurality of selective positions along the subframe. Similarly, the first and second parallel frame members are each formed with a plurality of etchings for locating and welding supports for the linkage at a respective plurality of selective positions along the hoist frame. The selective placement of a different size linkage at respective modular self-locating holes enables the hoist system to be modularly adjusted to provide different capacities.

According to an aspect of the invention, a hoist system is provided which can be readily installed to a vehicle chassis without welding.

According to another aspect of the invention, a hoist system is provided which can be installed to a vehicle chassis by an authorized dealer.

According to still another aspect of the invention, a hoist system is provided which can be installed to a vehicle chassis without permanent dedication of the vehicle for use with interchangeable bodies.

According to yet another aspect of the invention, a hoist system is provided which is resistant to damage from repeated mountings and remountings.

According to a further aspect of the invention, a hoist system is provided which can be quickly and readily replaced without causing damage to the vehicle chassis.

According to another further aspect of the invention, a modular hoist system is provided in which a different linkage can be selectively positioned to accommodate a variety of different capacities.

Other benefits and advantages of this invention will become apparent to those skilled in the art to which it pertains upon reading and understanding of the following detailed specification.

III. BRIEF DESCRIPTION OF THE DRAWINGS

The disclosed hoist for raising and mounting an interchangeable vehicle body onto a vehicle chassis may take physical form in certain parts and arrangement of parts, embodiments of which will be described in detail in this specification and illustrated in the accompanying drawings which form a part hereof and wherein.

Figure 17:
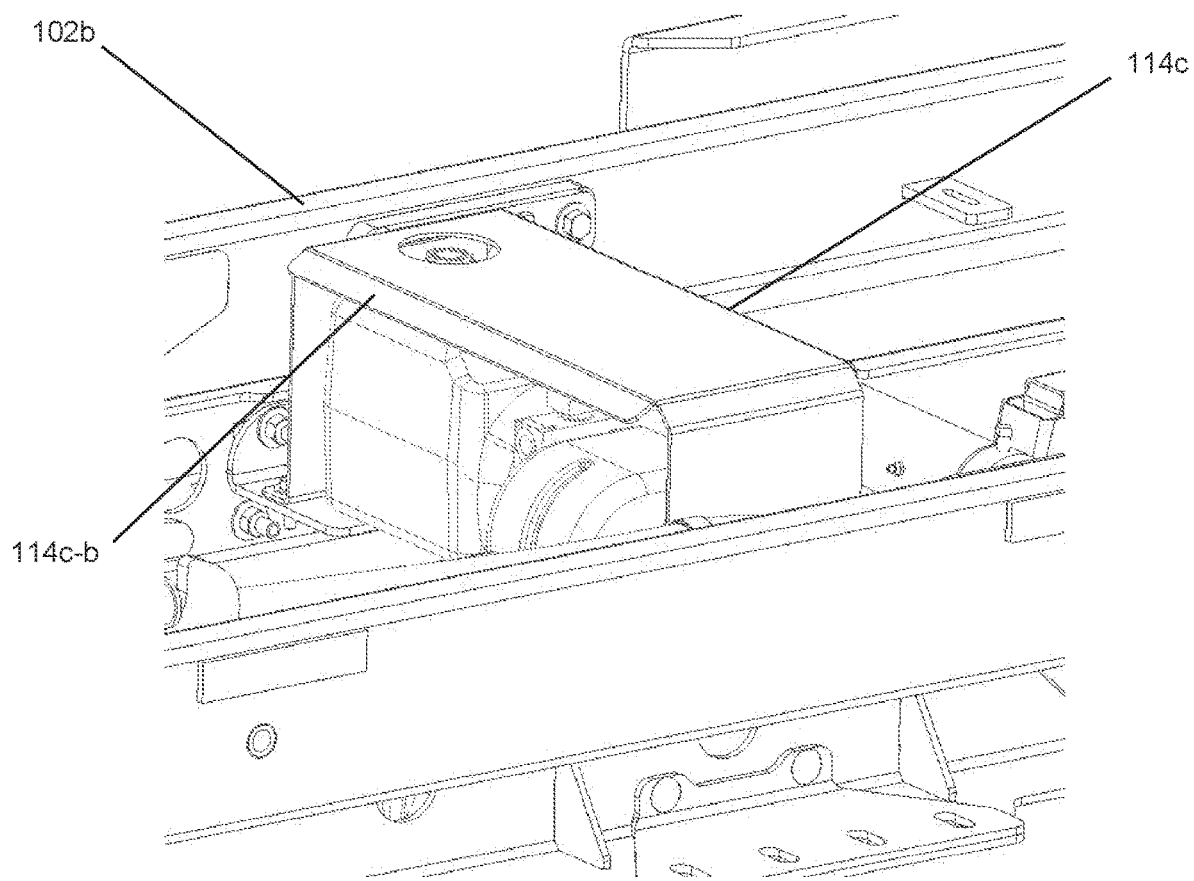
Figure 18:
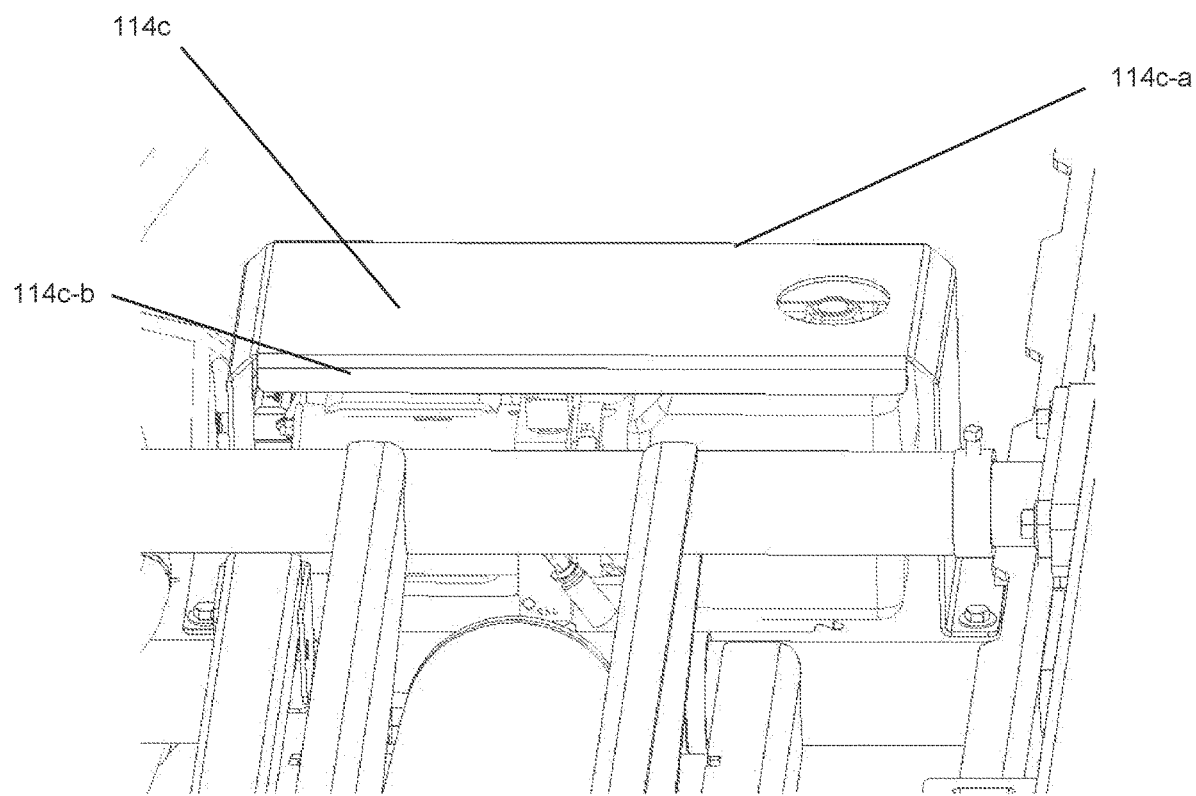
Figure 19:
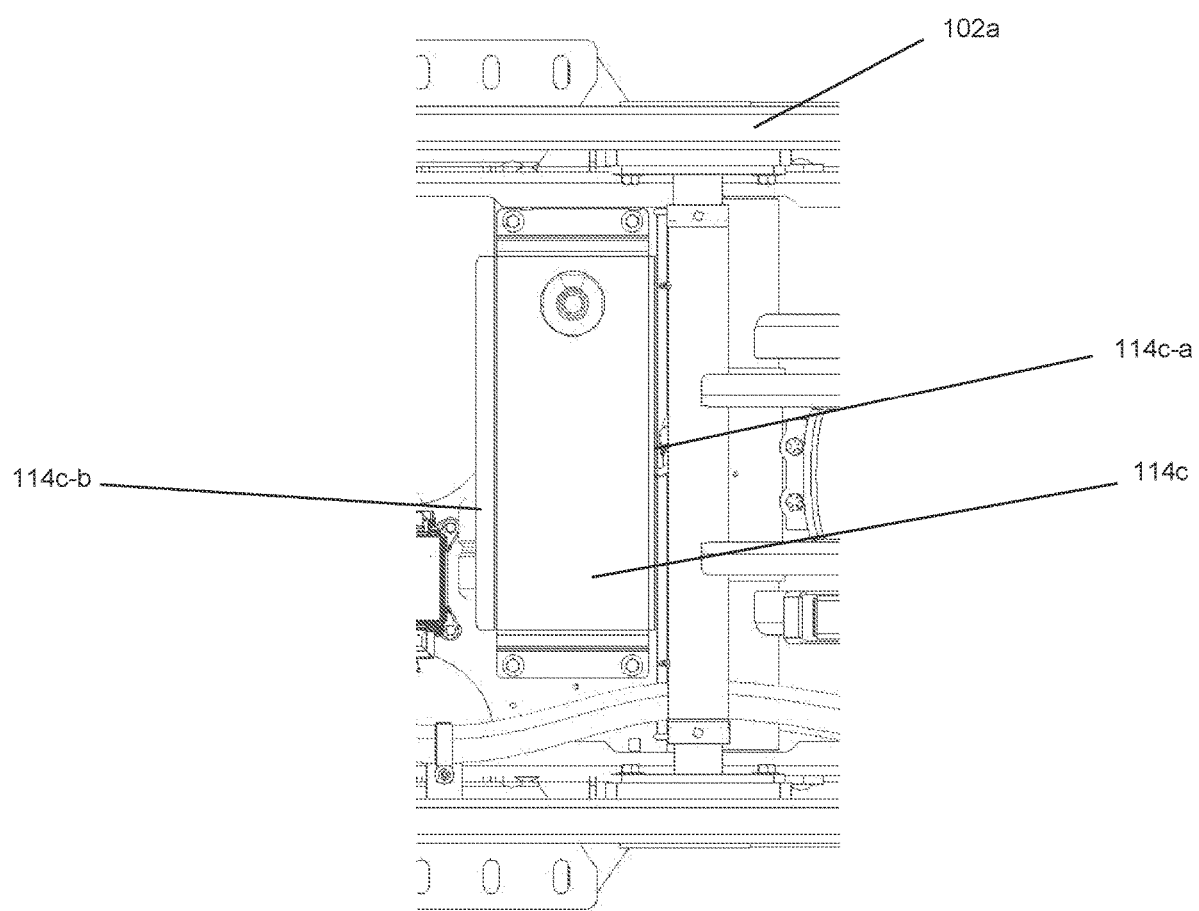
Figure 20:
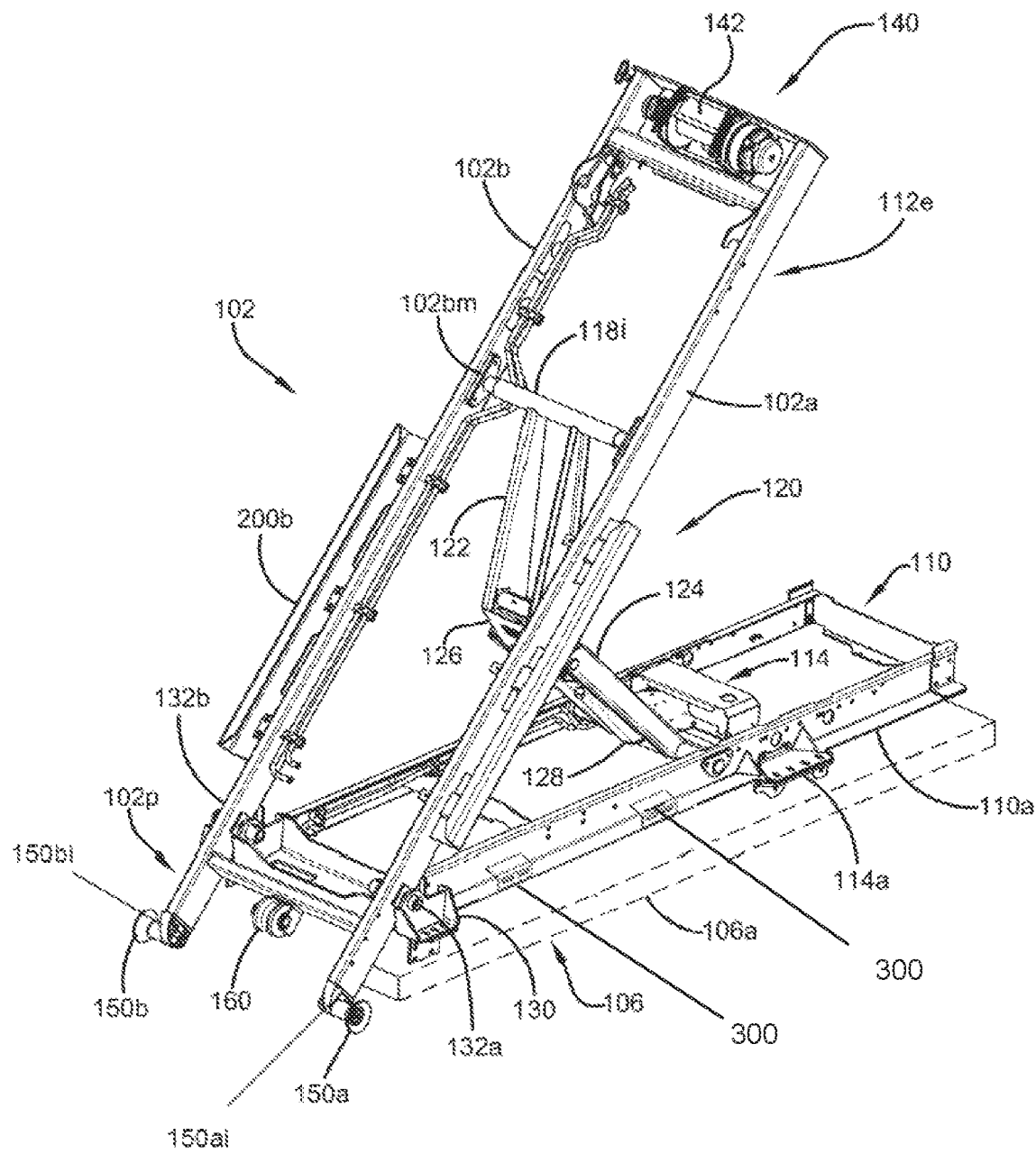

FIG. 17 is a side view of an alternative embodiment of a pump cover according to the present invention FIG. 18 is a rear view of an alternative embodiment of a pump cover according to the present invention FIG. 19 is an overhead view of an alternative embodiment of a pump cover according to the present invention FIG. 20 is a perspective view showing the right side of an alternate embodiment of a hoist system for raising and mounting an interchangeable vehicle body onto a vehicle chassis according to the present invention.

Figure 21:
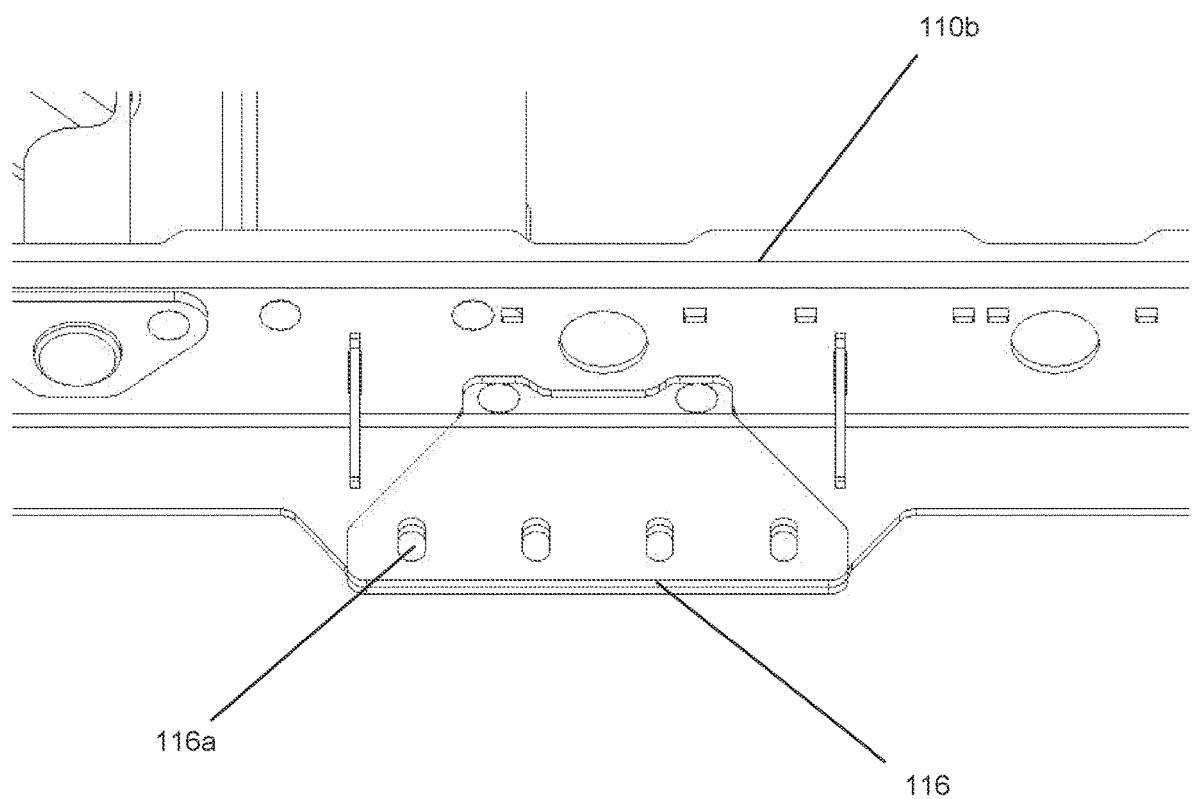

FIG. 21 is an oblique view of an alternative embodiment of a mounting portion according to the present invention.

Figure 22:
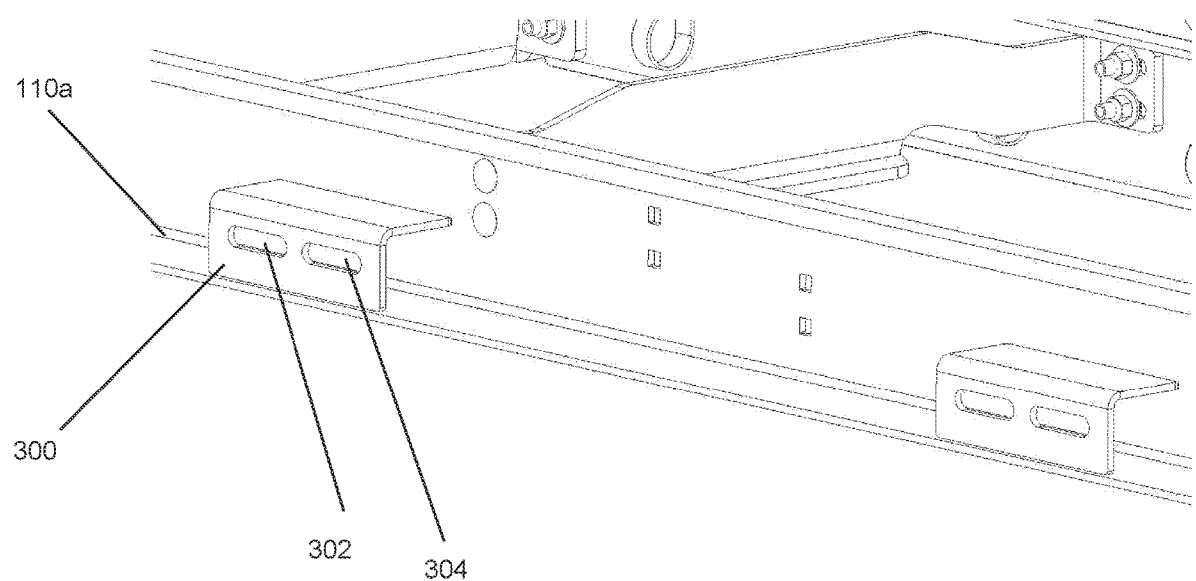

FIG. 22 is a detail view of a fender mount according to the alternative embodiment of hoist system of the present invention shown in FIG. 20.

Figure 23:
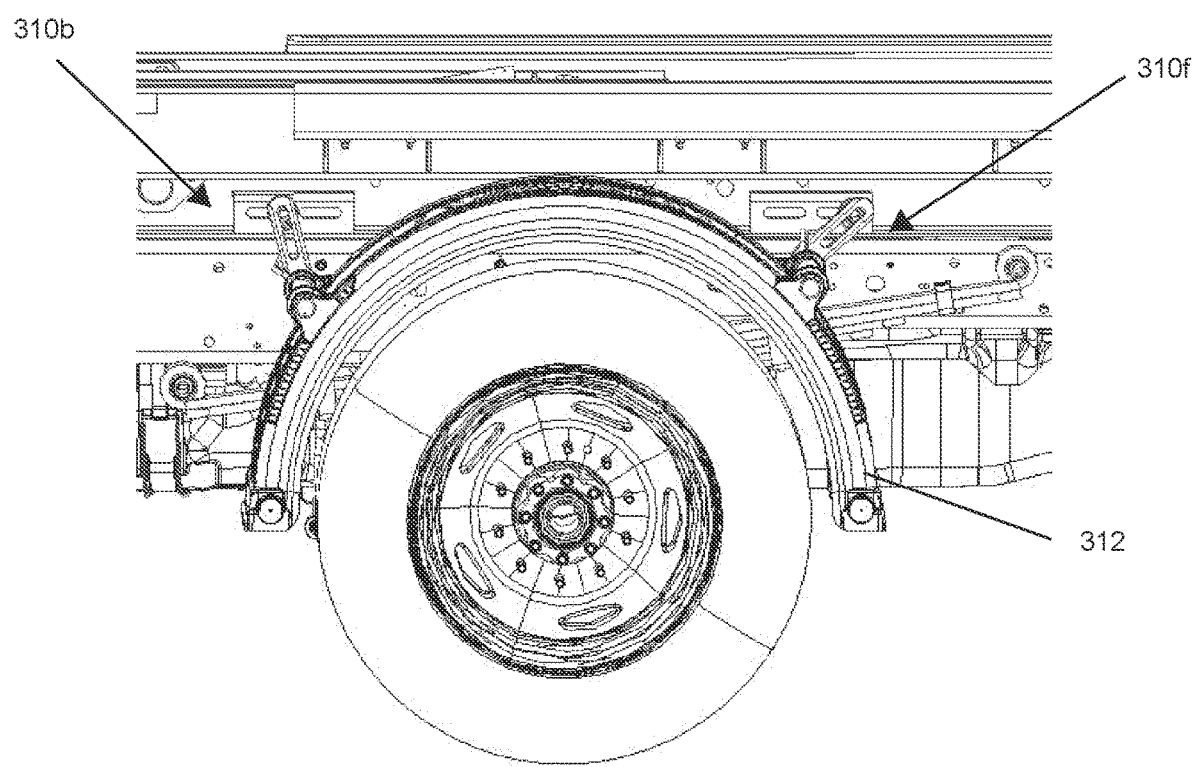

FIG. 23 is a side view of a vehicle having a fender assembly mounted onto the hoist system according to the alternate embodiment of the present invention shown in FIG. 20.

Figure 24:
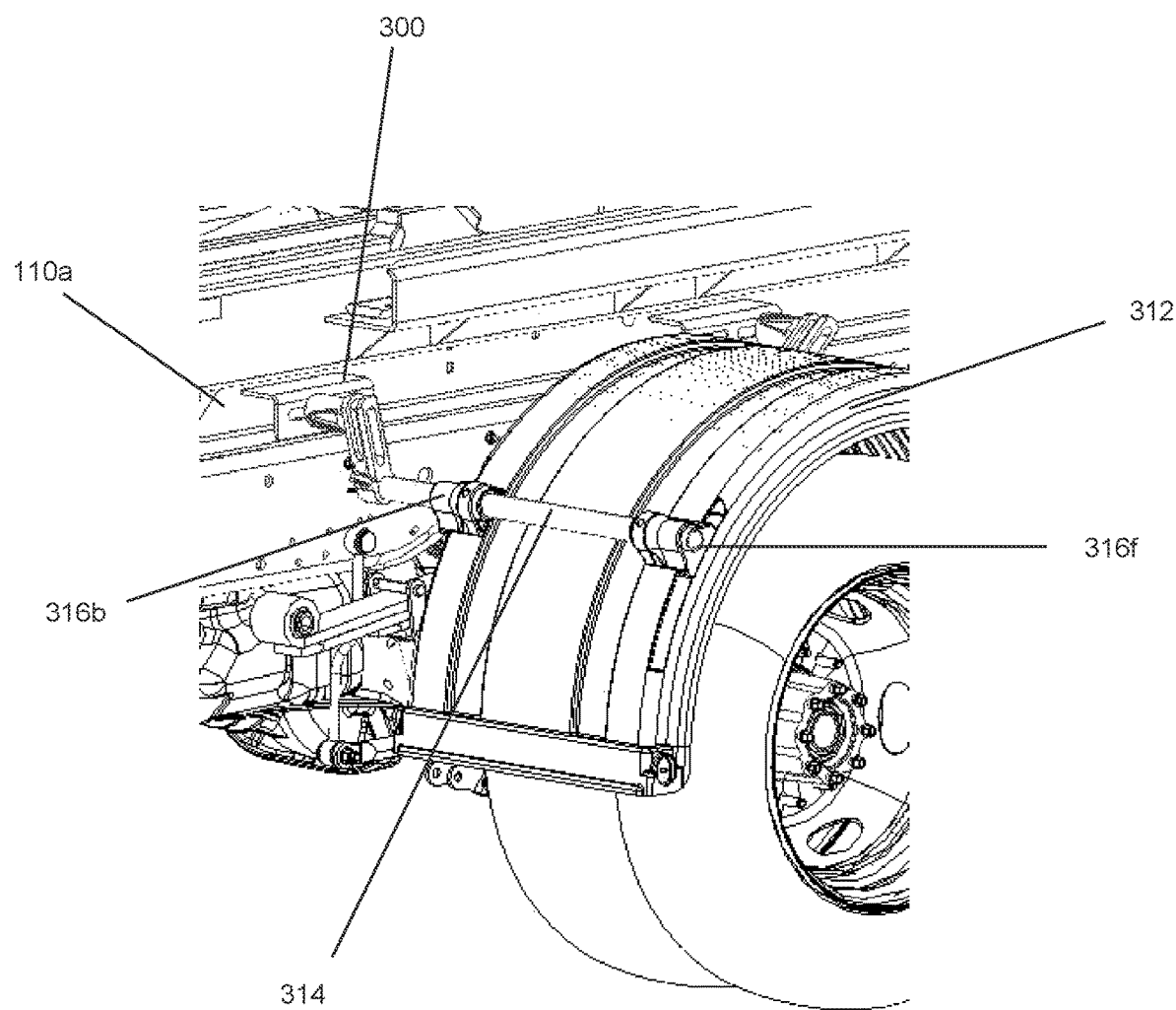

FIG. 24 is an oblique rear view of the fender assembly mounted onto the hoist system according to the alternate embodiment of the present invention shown in FIG. 20.

Figure 25:
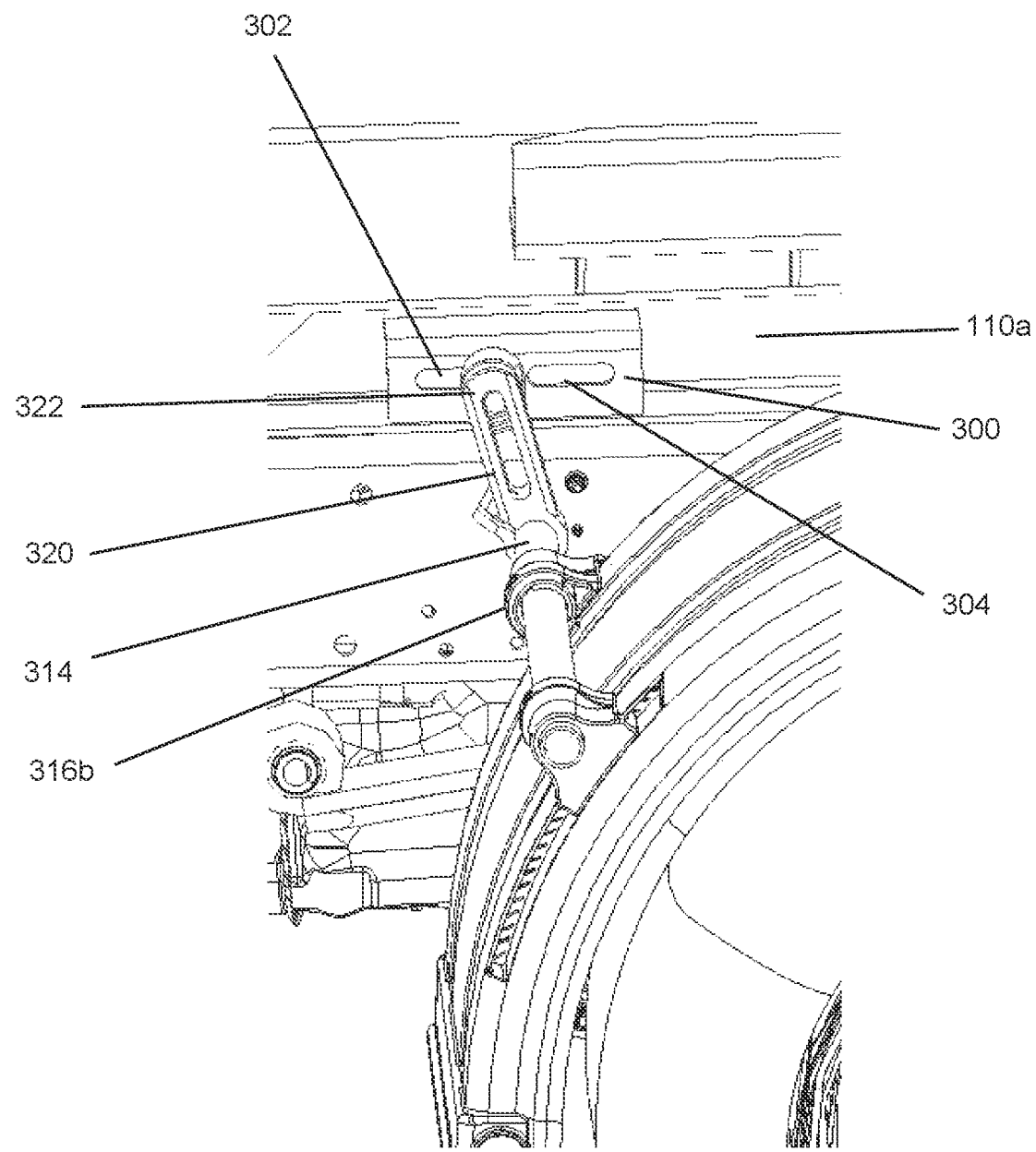

FIG. 25 is a detail side view of the fender assembly mounted onto the hoist system according to the alternate embodiment of the present invention shown in FIG. 20.

Figure 26:
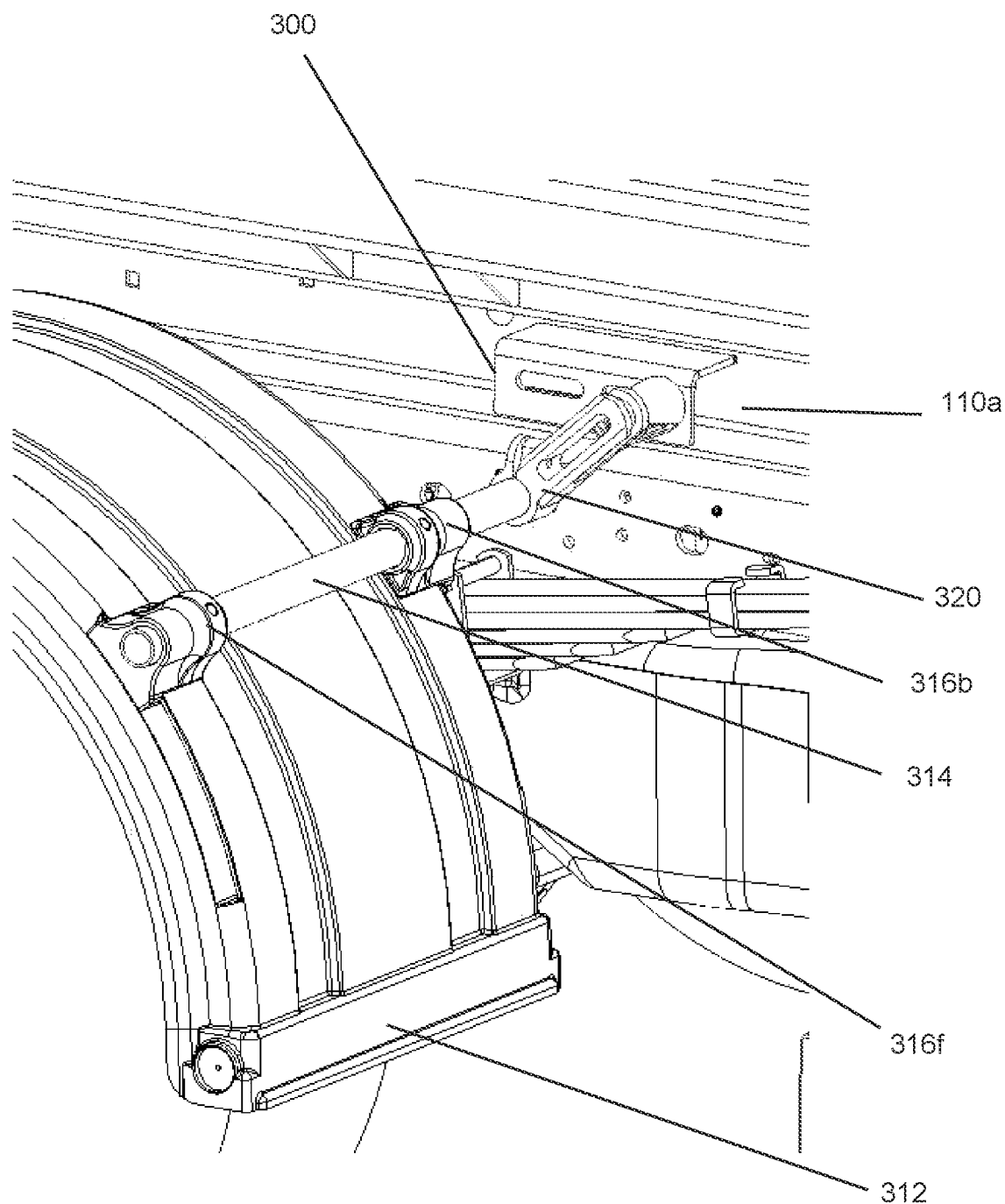

FIG. 26 is an oblique front view of the fender assembly mounted onto the hoist system according to the alternate embodiment of the present invention shown in FIG. 20.

Figure 27:
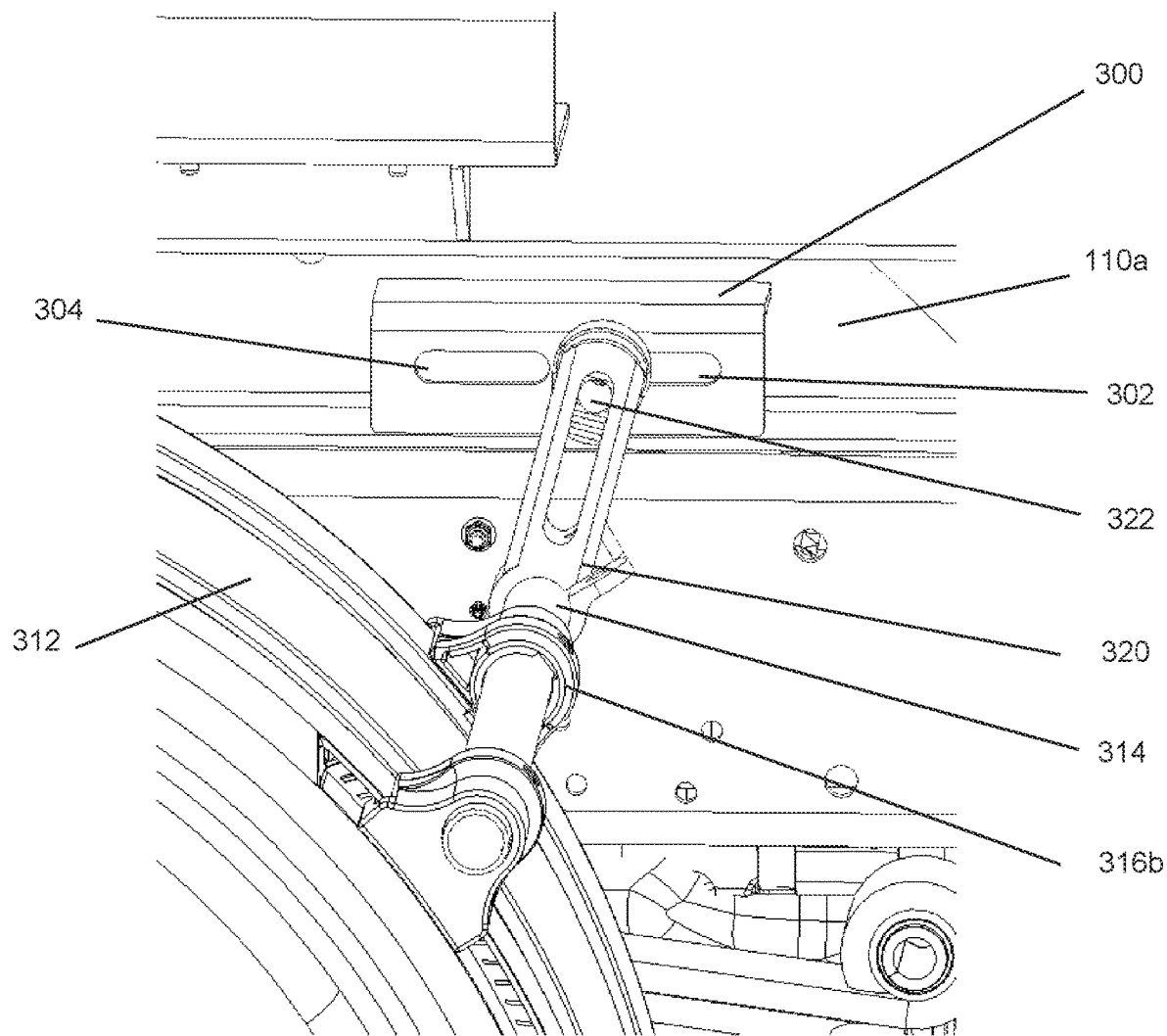

FIG. 27 is a detail front view of the tender assembly mounted onto the hoist system according to the alternate embodiment of the present invention shown in FIG. 20.

Figure 28:
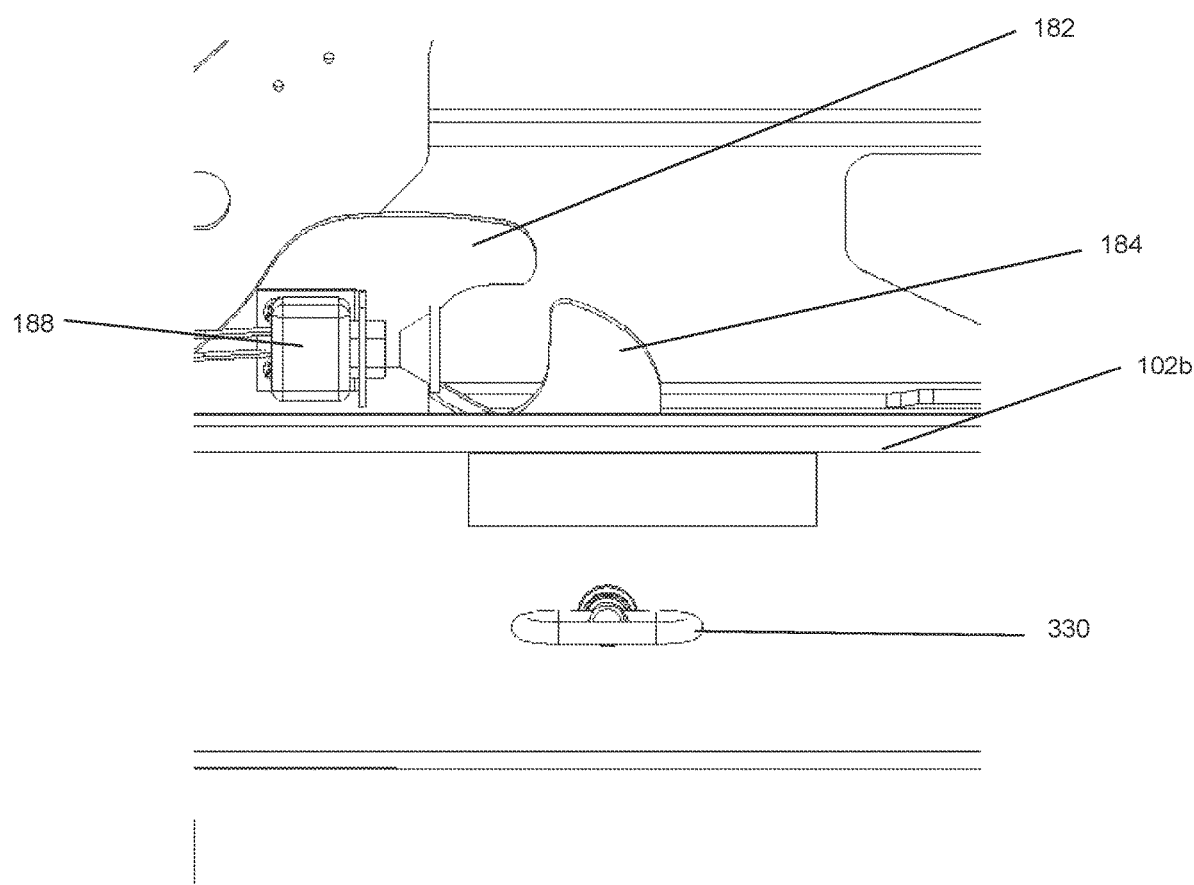

FIG. 28 is a side oblique view of an engaging pin according to an embodiment of the present invention.

Figure 29:
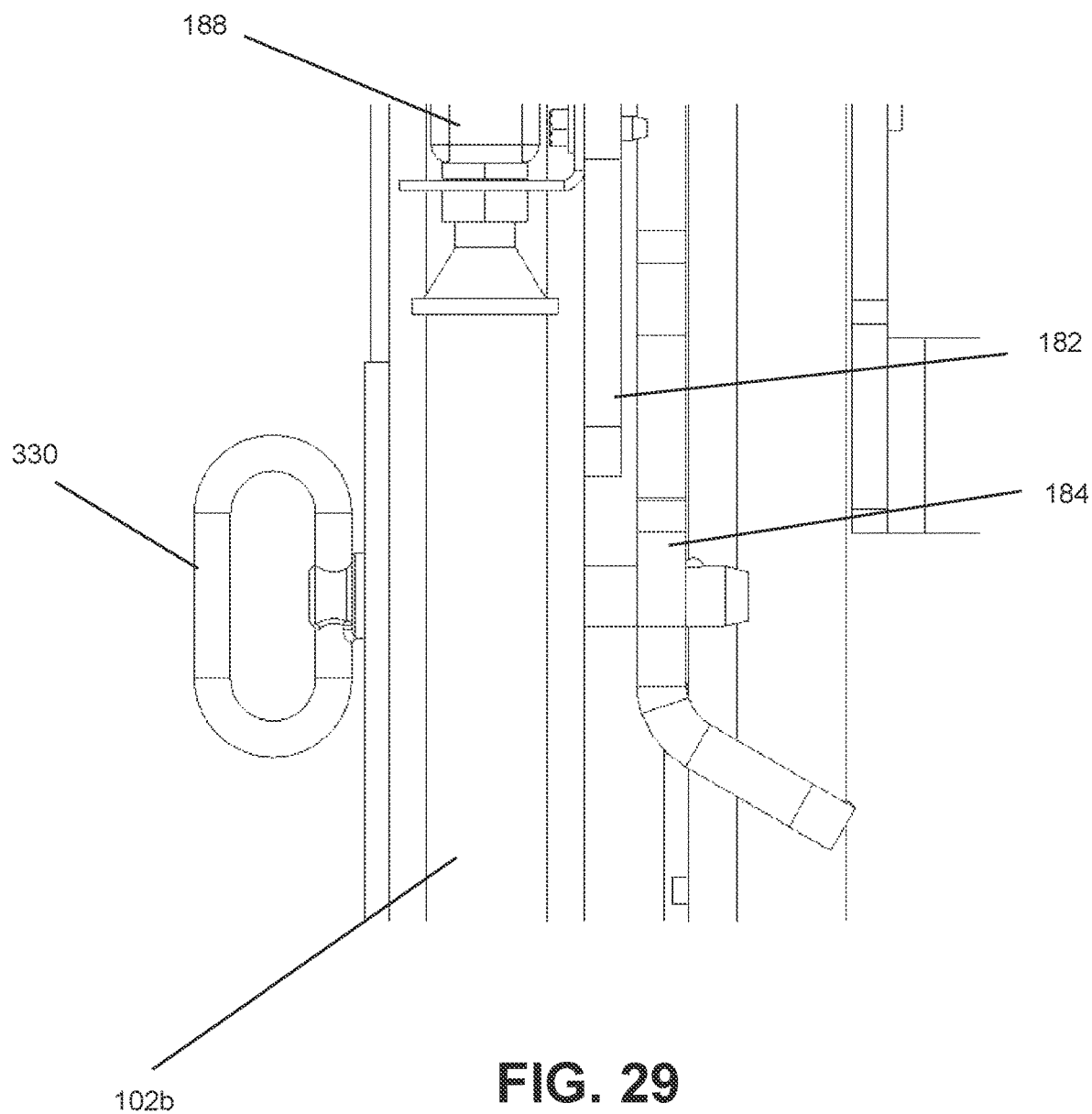

FIG. 29 is a top view of the engaging pin according to an embodiment of the present invention shown in FIG. 28.

Figure 30A:
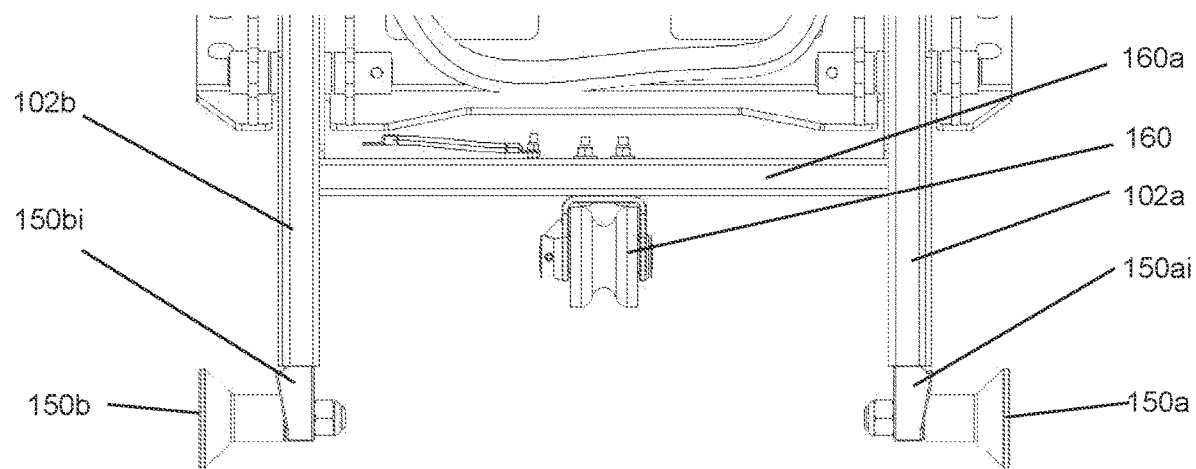
Figure 30B:
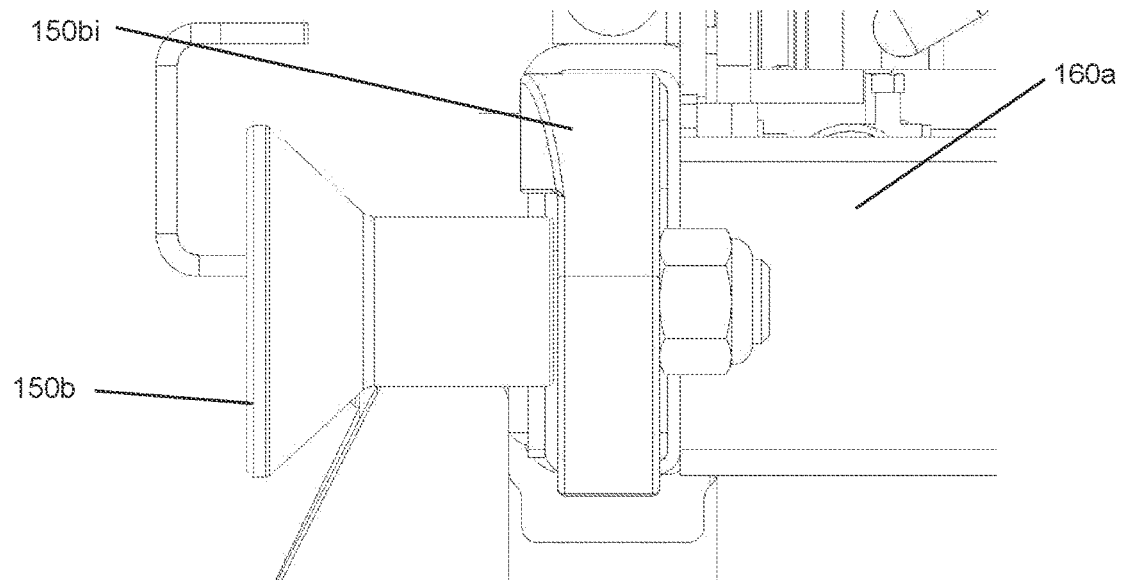

FIGS. 30A and 30B are detail views showing the connections between the pulleys and the hoist frame according to an embodiment of the present invention.

Figure 31:
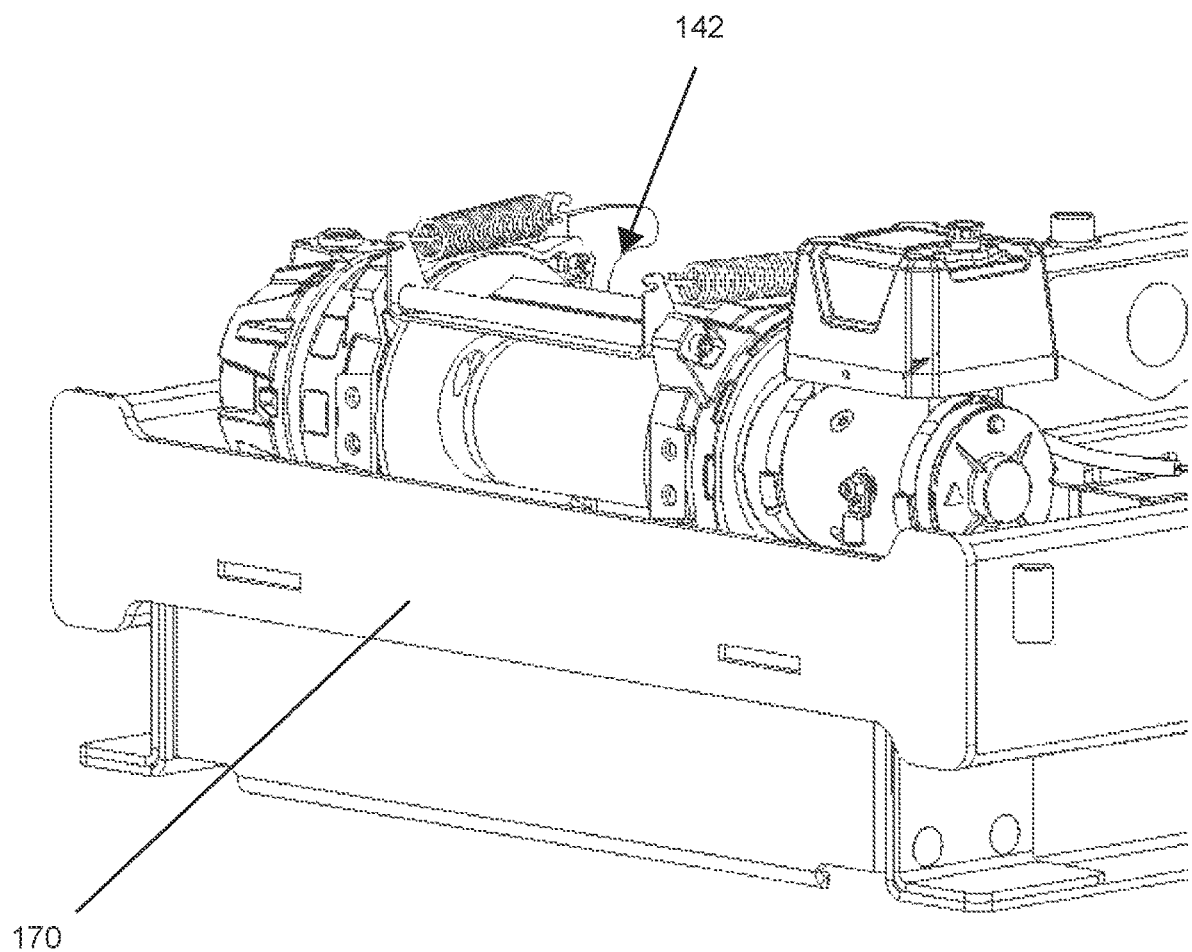

FIG. 31 is an oblique view depicting details of the back plate or winch plate according to an embodiment of the present invention.

Figure 32:
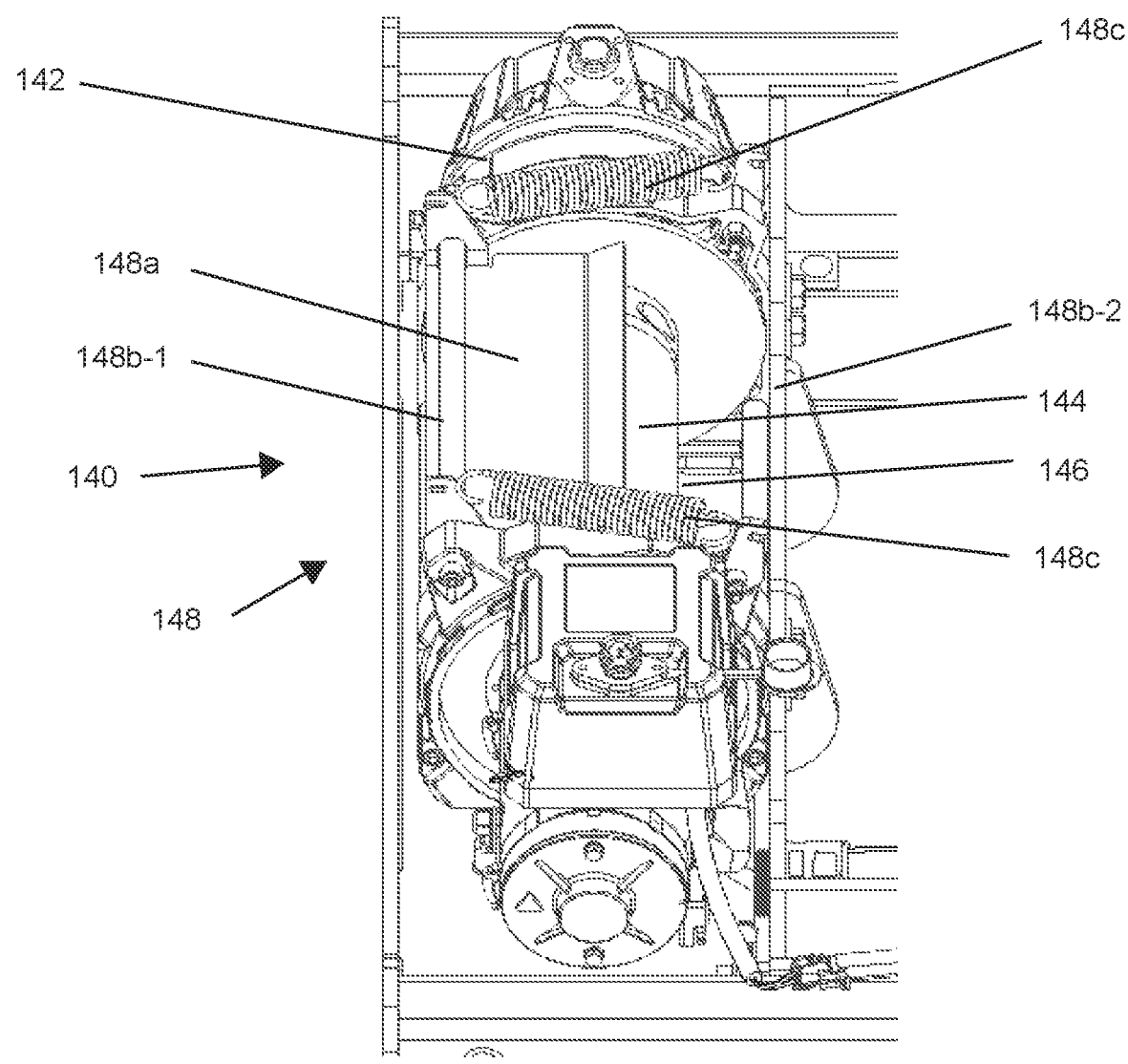

FIG. 32 depicts the winch assembly according to an embodiment of the present invention.

Figure 33A:
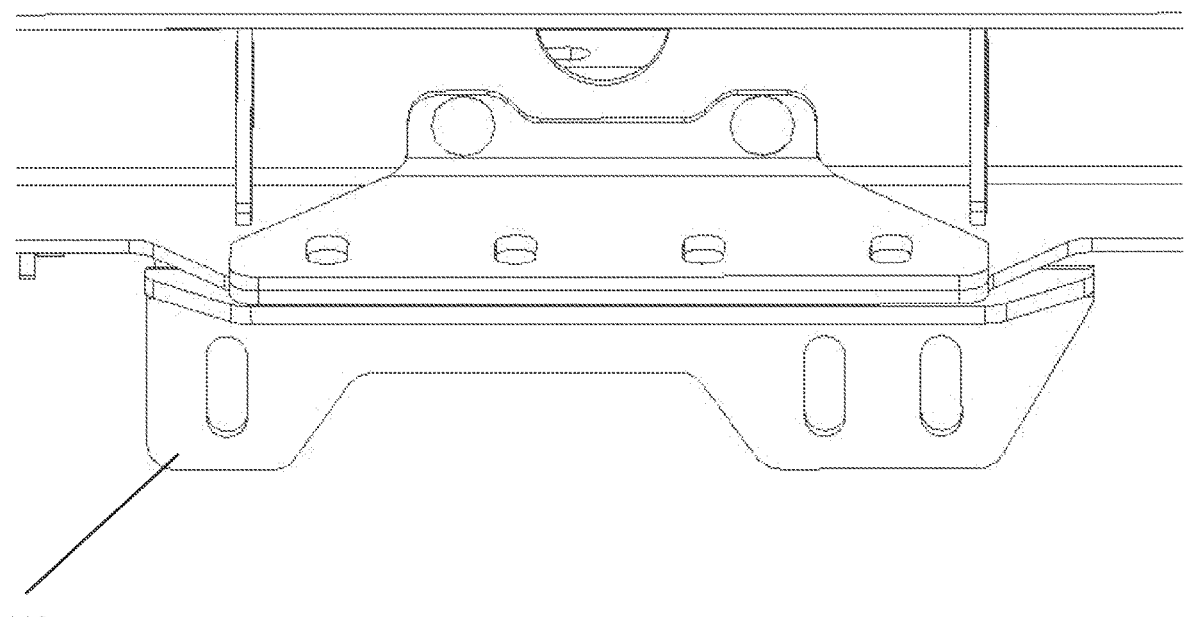
Figure 33B:
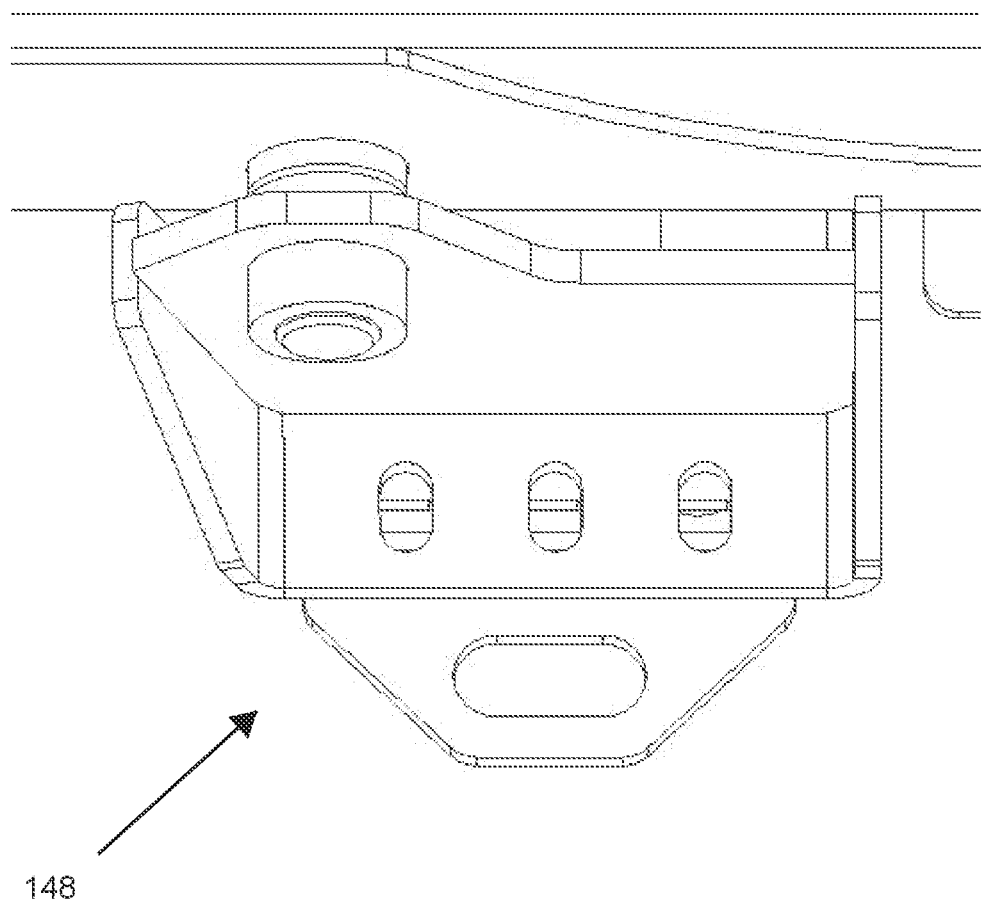

FIGS. 33A and 33B depict the mounting bracket according to an embodiment of the present invention.

IV. DETAILED DESCRIPTION

Figure 1:
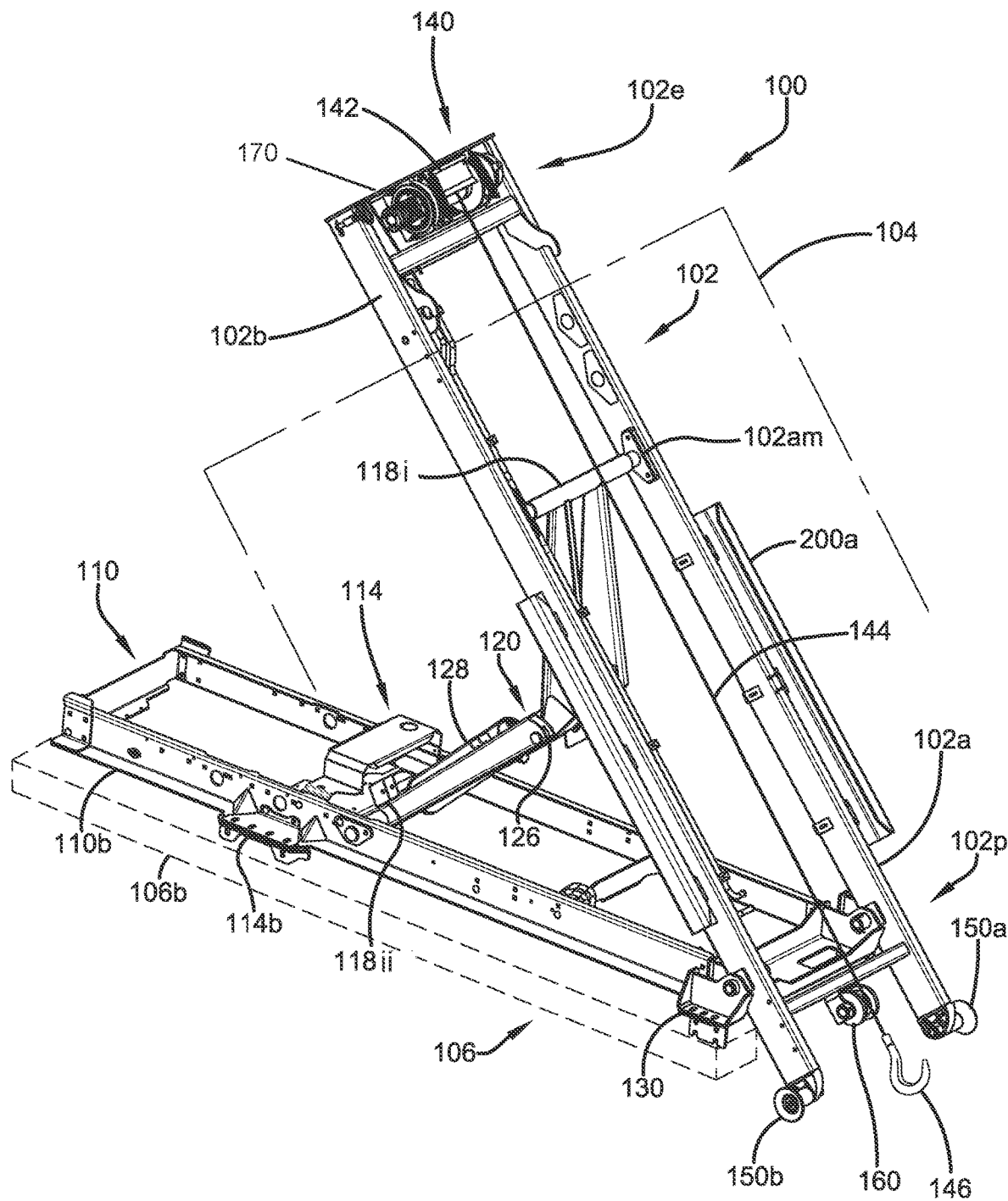
FIG. 1 is a perspective view showing the left side of an exemplary embodiment of a hoist system for raising and mounting an interchangeable vehicle body onto a vehicle chassis according to the present invention.
Figure 2:
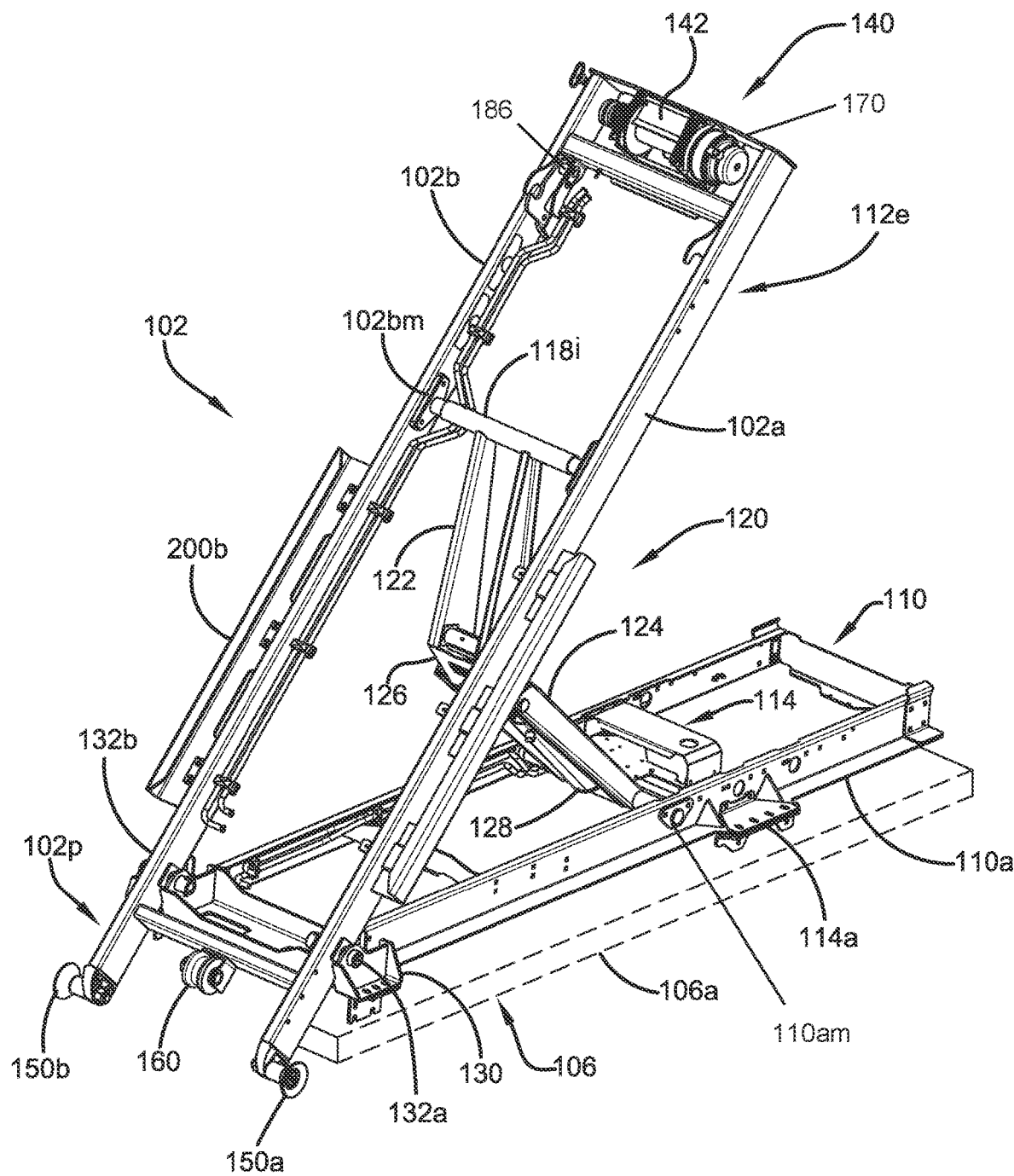
FIG. 2 is a perspective view showing the right side of an exemplary embodiment of a hoist system for raising and mounting an interchangeable vehicle body onto a vehicle chassis according to the present invention.

Referring now to the drawings wherein the showings are for purposes of illustrating embodiments of the article only and not for purposes of limiting the same, and wherein like reference numerals are understood to refer to like components:

FIGS. 1 and 2 are perspective views respectively showing the left and right sides of exemplary embodiments of a hoist system 100 according to the present invention. The hoist system 100 includes a hoist frame 102 for raising and mounting an interchangeable vehicle body 104 onto a vehicle chassis 106. The hoist frame 102 is defined by first and second parallel frame members 102a, 102b. The hoist frame 102 is provided for slidably supporting the interchangeable body 104. The hoist frame 102 includes a pivot end 102p, about which the hoist frame 102 pivots, and an elevated end 102e, which is elevated when raising and mounting the interchangeable vehicle body 104, as will be described in greater detail hereinbelow. The frame members 102a, 102b extend along the longitudinal axis of the hoist frame 102 that extends between the elevated end 102e and the pivot end 102p.

It is to be appreciated that the present specification includes descriptions of similar components such as the frame members 102a, 102b in which identical corresponding structures are described and given similar reference numerals. Insofar as both of such corresponding structures may not be clearly shown in a particular view, especially a detail view, it is to be understood and appreciated such corresponding structures resemble the structures that are clearly shown in the views.

Figure 4:
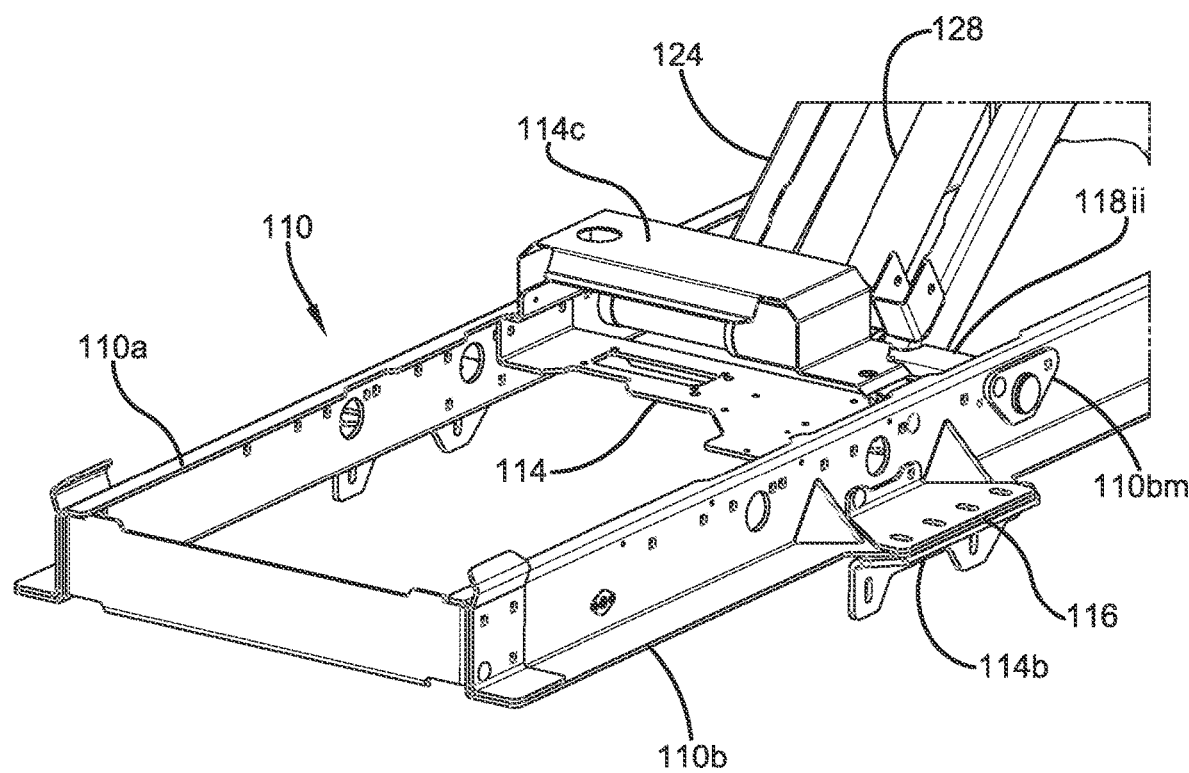
FIG. 4 is a detail view of the subframe with the pump plate cover and the linkage component according to an exemplary embodiment of the present invention.

A subframe 110 is provided for ultimately connecting the hoist frame 102 to the vehicle chassis 106. The subframe 110 is defined by a bolt-on assembly for fixedly connecting the hoist frame 102 to the vehicle chassis 106. Specifically, the subframe 110 is connected to the vehicle chassis 106 at the mounting brackets 116a, 116b, and the hinge assembly 130. As particularly shown in the detail view of in FIG. 4 and alternatively in FIGS. 33A and 33B, the mounting bracket 116 is formed integrally with the subframe 110 and includes mounting portions 114a, 114b that engage the vehicle chassis 106. The mounting portions 114a, 114b each include a series of mounting holes that receive bolts to enable the mounting bracket 116, and thus the subframe 110 to be bolted to the vehicle chassis 106. Similar structures are included on the hinge assembly 130 as will be explained hereinbelow. A cover 114c is provided to protect the pump from damage. The cover 114c can be made of metal or plastic or any other suitable material.

The subframe 110 is sized so that the mounting bracket 116 can be bolted on to first and second parallel vehicle chassis members 106a, 106b. It is to be appreciated that the pump plate 114 can be easily bolted into different locations of the subframe 110 to accommodate different classes of vehicles and different hoist capacities and dump angles (as will be explained in greater detail hereinbelow). The subframe 110 thus eliminates the need for welding to the vehicle chassis 106 and the resulting damage thereto. The mounting portions 116 are reinforced members for providing support to the hoist system 100. This enables the subframe 110 to be made of prefabricated sheet metal portions, which is a lighter, less expensive material than the structural steel used with previous type welded hoist systems, resulting in improved economy and efficiency with the present invention.

With further reference to FIGS. 1 and 2, a linkage is provided for connecting the hoist frame 102 to the subframe 110. The linkage is preferably a type of hinge joint member 120 for raising the elevated end 102e of the hoist frame 102. The hinge joint member 120 includes an upper leaf member 122 and a lower leaf member 124 which are pivotally connected to each other by a pin member 126.

Figure 3:
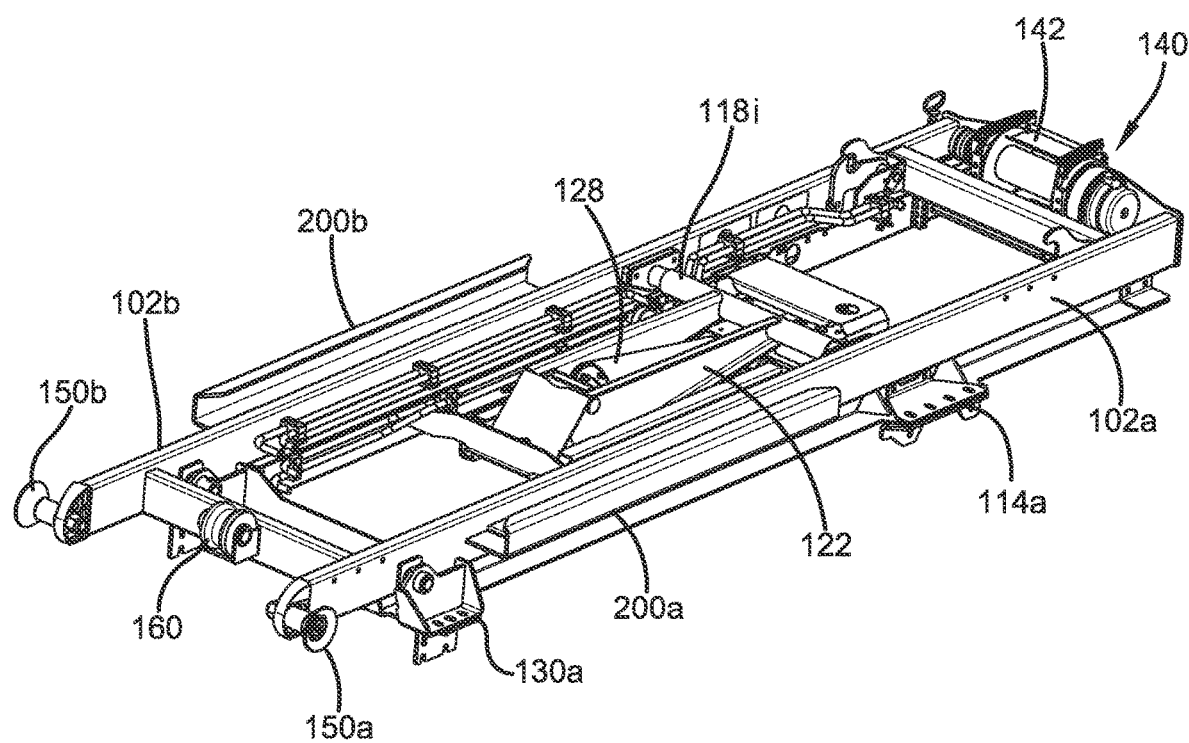
FIG. 3 is a perspective view of a collapsed state of an exemplary embodiment of a hoist system for raising and mounting an interchangeable vehicle body onto a vehicle chassis according to the present invention.

The upper and lower leaf members 122, 124 each include a pair of parallel structures designed to nest inside each other when the hoist system 100 is in a collapsed position as shown in FIG. 3, when the interchangeable body 104 (not shown in this view) is fully mounted and secured to the vehicle chassis 106. The upper leaf member 122 is moveably connected to the hoist frame 102 by a first pivot bar 118i that spans the parallel frame members 102a, 102b and secured to rotate therebetween during raising and lowering of the hoist system 100. The lower leaf member 124 is moveably connected to the subframe 110 by a second pivot bar 118ii to rotate therebetween during raising and lowering of the hoist system 100.

The hinge joint member 120 is raised and lowered to raise and lower the elevated end 102e of the hoist frame 102 using a hydraulic pump cylinder 128. The hydraulic pump cylinder 128 is also attached to the second pivot bar 118ii that engages the subframe 110 along with the lower leaf member 124. These aspects are especially shown in the collapsed view of FIG. 3 along with the view of FIG. 4. The hydraulic pump cylinder 128 nests inside the lower leaf member 124 when in the collapsed position. Specifically, the hydraulic pump cylinder 128 is attached to the subframe 110, so that forces from the hydraulic pump cylinder 128 are transferred to the mounting points 114a and 114b.

A special feature of the present hoist system 100 is that it is modular in construction, enabling a variety of different configurations to suit a variety of different applications. As shown particularly in 4, the subframe 110 includes first and second parallel subframe members 110a, 110b which are each formed with a plurality of modular self-locating holes. The figure depicts three modular self-locating holes, though any suitable number can be employed without departing from the invention. The second pivot bar 118ii can be removably inserted and retained in a respective pair of opposing holes and secured with respective chevron-shaped modular connection brackets 110am, 110bm. The subframe members 110a, 110b are formed with suitable bolt holes for enabling the connection brackets 110am, 110bm to be securely bolted thereto. The plurality of modular self-locating holes enables the second pivot bar 118ii to be engaged and supported at a respective plurality of selective positions along the subframe 110

As depicted in FIGS. 1 and 2, a similar plurality of modular etchings can also be formed on the first and second parallel frame members 102a, 102b. The first pivot bar 118i can be removably inserted and retained in a respective pair of opposing holes and secured with respective chevron-shaped modular connection brackets 102am, 102bm. The first and second parallel frame members 102a, 102b receive welded-on chevron-shaped plates for enabling the connection brackets 102am, 102bm to be securely bolted thereto. The plurality of modular self-locating holes enables the first pivot bar 118i to be engaged and supported at a respective plurality of selective positions along the hoist frame 102.

By selectively positioning the first and second pivot bars 118i, 118ii, the hoist system 100 can be selectively adjusted to be close to or farther from the vehicle cab along the hoist frame 102, in order to accommodate different types of interchangeable bodies having different weights and other various capacities. For example, when used with a dump body, the linkage is used for dumping, and the selective positioning of the pivot bars 118i, 118ii is useful for selecting a suitable dump angle for a given load.

With continued reference to FIGS. 1 and 2, a hinge assembly 130 is provided for pivotally connecting to the pivot end 102p of the hoist frame 102. Like the mounting bracket 116, the hinge assembly 130 is a bolt-on assembly for fixedly connecting the hoist system 100 to the vehicle chassis 106. The hinge assembly 130 includes first and second pivot pins 132a, 132b, about which the hoist frame 102 pivots during raising and lowering of the hoist. The pivot pins 132a, 132b are mounted on each respective side of the hoist frame 102, through bores formed in respective parallel frame members 102a, 102b.

Figure 6:
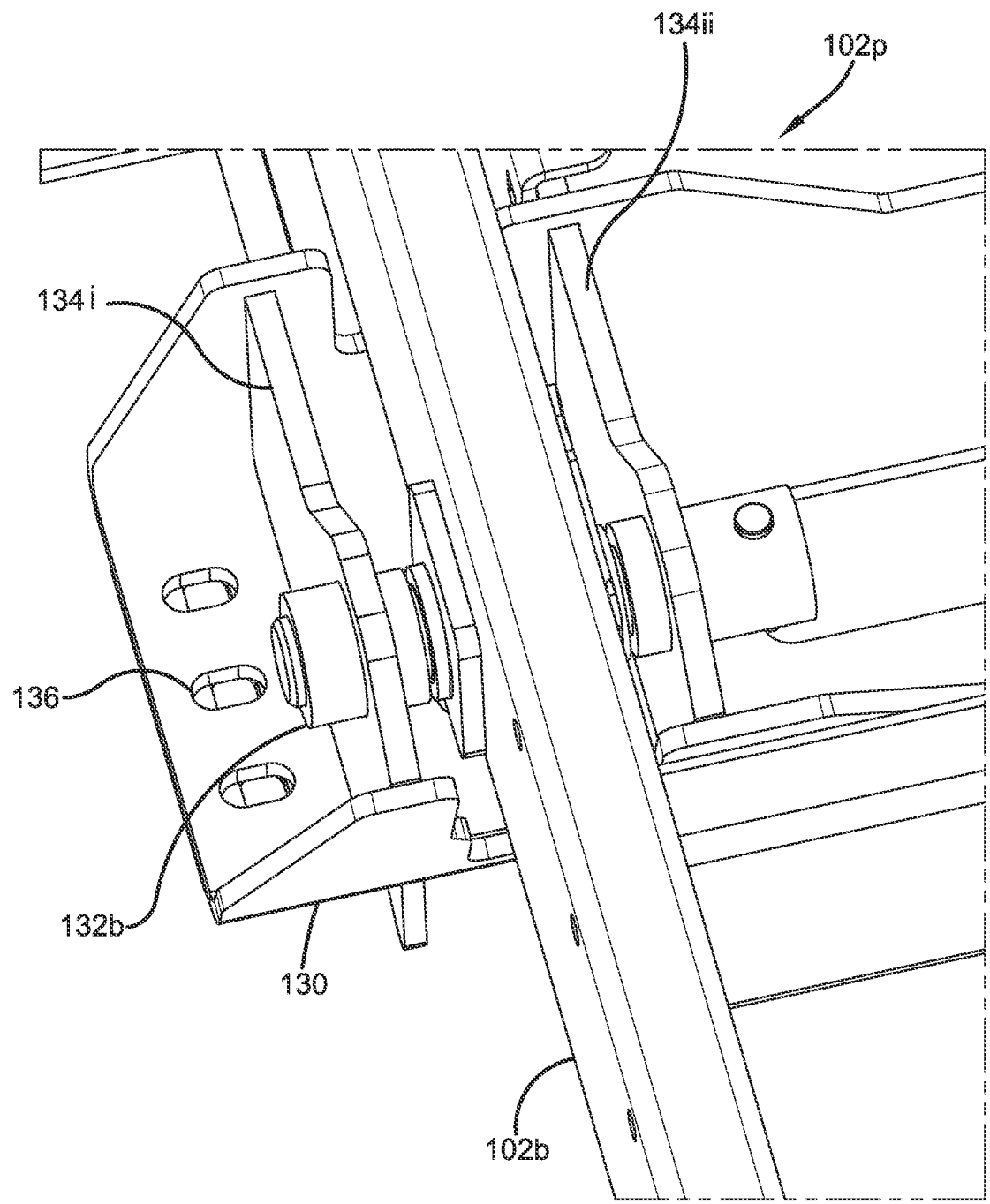
FIG. 6 is a detail view of the pivot end of the hoist body according to an exemplary embodiment of the present invention.

As particularly shown in the detail view of FIG. 6, which shows one side of the pivot end 102p, the second pivot pin 132b is received through bores in transverse portions 134i, 134ii of the hinge assembly 130, which are on opposite sides of the bore in the second parallel frame member 102b. The second pivot pin 132b can be of a common type structure and include a cotter pin for retaining the pin 132b against accidental slippage, as is understood in the art. It is to be appreciated that there is a similar structure associated with the first pivot pin 132a through the first parallel frame member 102a and the hinge assembly 130. As also shown in FIG. 6, the hinge assembly 130 includes a series of mounting holes 136 that receive bolts to enable the hinge assembly 130 to be bolted to the vehicle chassis 106 using common type bolts as are known in the art.

As particularly shown in FIG. 1, a winch assembly 140 is retained in the elevated end 102e of the hoist frame 102. The winch assembly 140 includes a winch motor 142 that feeds out a cable 144 that extends along the longitudinal axis of the hoist frame 102 to the pivot end 102p and connects to a hook 146, for raising the interchangeable body 104 onto the hoist frame 102. In the preferred embodiment, the hook 146 is a swivel hook that swivels on the end to release any torsion on the cable 114 that might result from twisting, which would reduce the working life of the cable 144. In the preferred embodiment, the winch motor 142 is an electric motor, but can also be a hydraulic motor.

Figure 5:
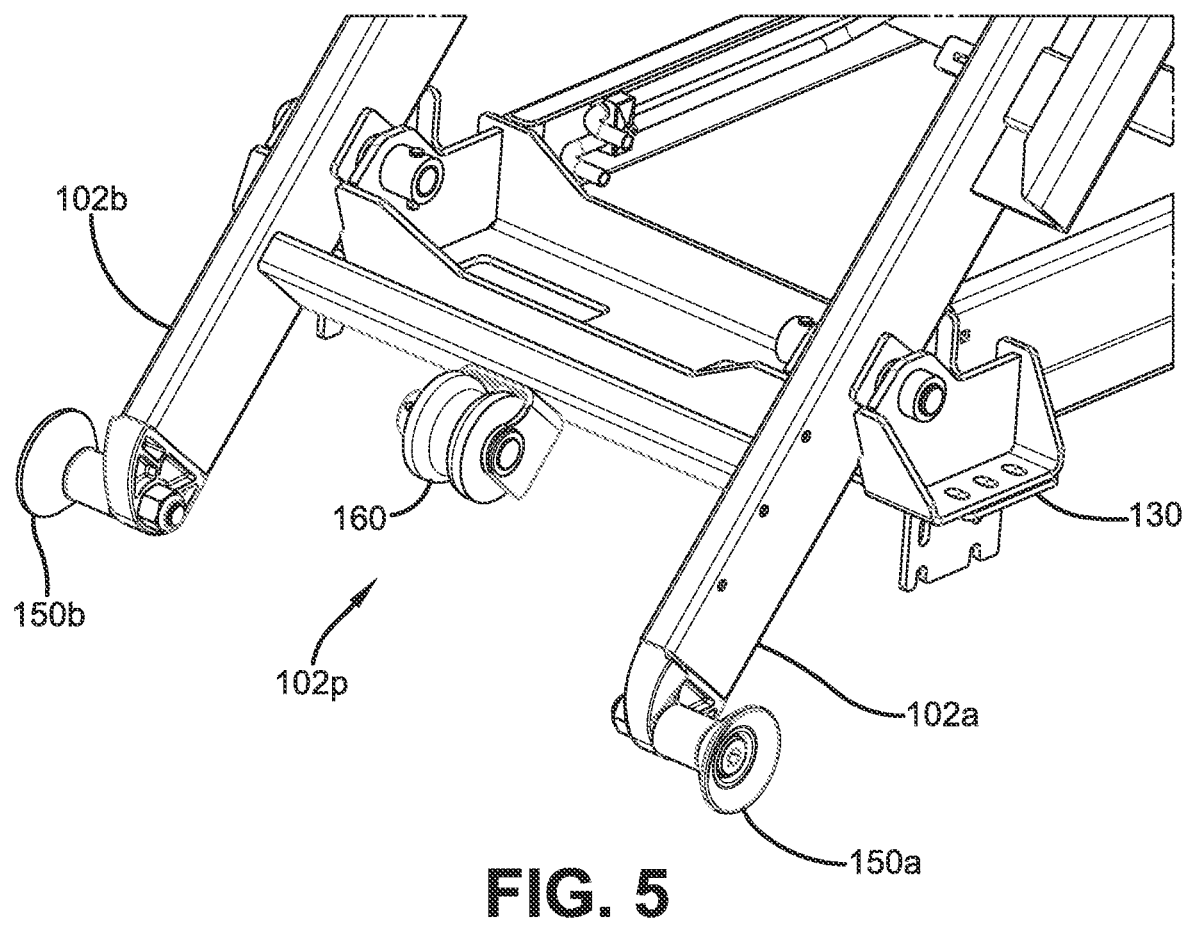
FIG. 5 is a detail view of the rollers at the pivot end of the hoist body according to an exemplary embodiment of the present invention.

As particularly shown in the detail view of FIG. 5, first and second pulleys or rollers 150a, 150b are provided at the pivot end 102p of the hoist body 102. The first and second rollers 150a, 150b are connected to the respective ends of the first and second parallel frame members 102a, 102b so as to face in an outward direction, away from the longitudinal axis of the hoist frame 102. In this manner, the rollers 150a, 150b engage the interchangeable body during raising and mounting to the hoist 100, to provide low friction support during movement. In the preferred embedment embodiment, as also shown in FIGS. 30A and 30B, castings 150ai, 150bi are formed onto the respective ends of the first and second parallel frame members 102a, 102b at the pivot end 102p for connecting the first and second pulleys 150a, 150b to the hoist frame 102.

As a special feature, the first and second rollers 150a, 150b are greaseless rollers, for providing an even lower frictional engagement for further facilitating mounting of the interchangeable vehicle body onto the hoist 100. In the preferred embodiment, the greaseless rollers 150a, 150b are steel casted parts with phenolic bearings inside to replace the manually fabricated metal rollers which performed with a metal-on-metal surface which required grease in previous type devices, thereby further reducing wear and tear.

Figure 7:
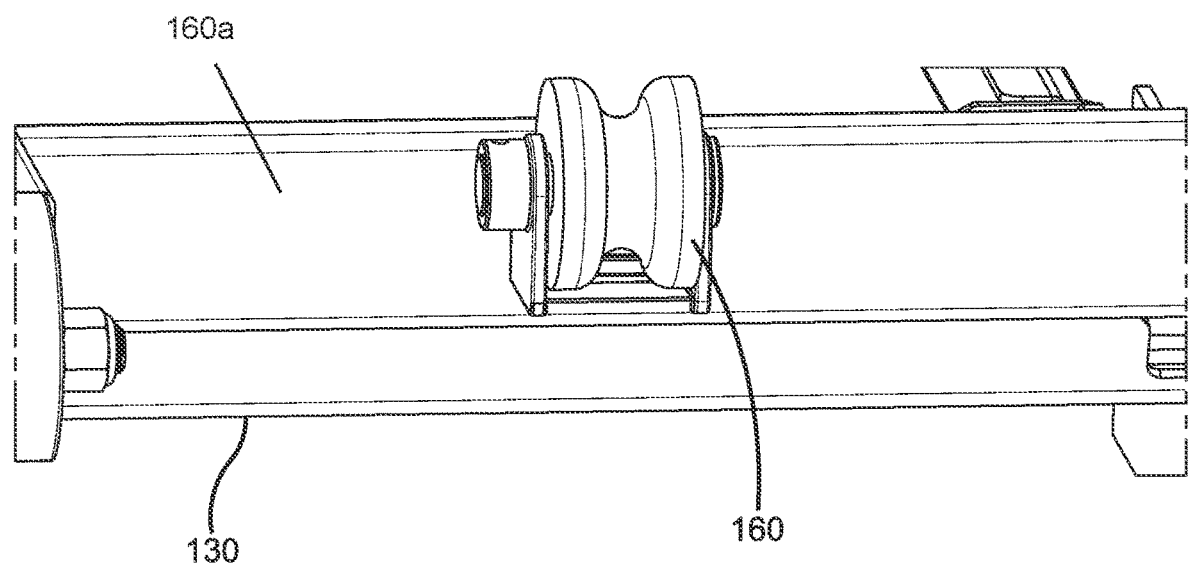
FIG. 7 is a detail view of the V-roller according to an exemplary embodiment of the present invention.

As particularly shown in the detail view of FIG. 7, a V-roller 160 is provided on the cross-member 160a between frames 102a and 102b. In the preferred embodiment, the Vroller 160 is a greaseless V-roller assembly for slidably supporting the cable 144 of the winch assembly 140 having a "V-shaped" profile with a tapered section in the middle of the V-roller 160 having a narrower diameter than the diameter at the ends of the V-roller 160. In this manner, the V-roller 160 provides support and guidance for the cable 144 when raising the interchangeable body 104 onto the hoist frame 102. In the preferred embodiment, the V-roller 160 is formed of a polymer material such as Nylatron® to replace the metal rollers used in previous type devices, thereby further reducing wear and tear on the cable 114 and not requiring grease.

Figure 8:
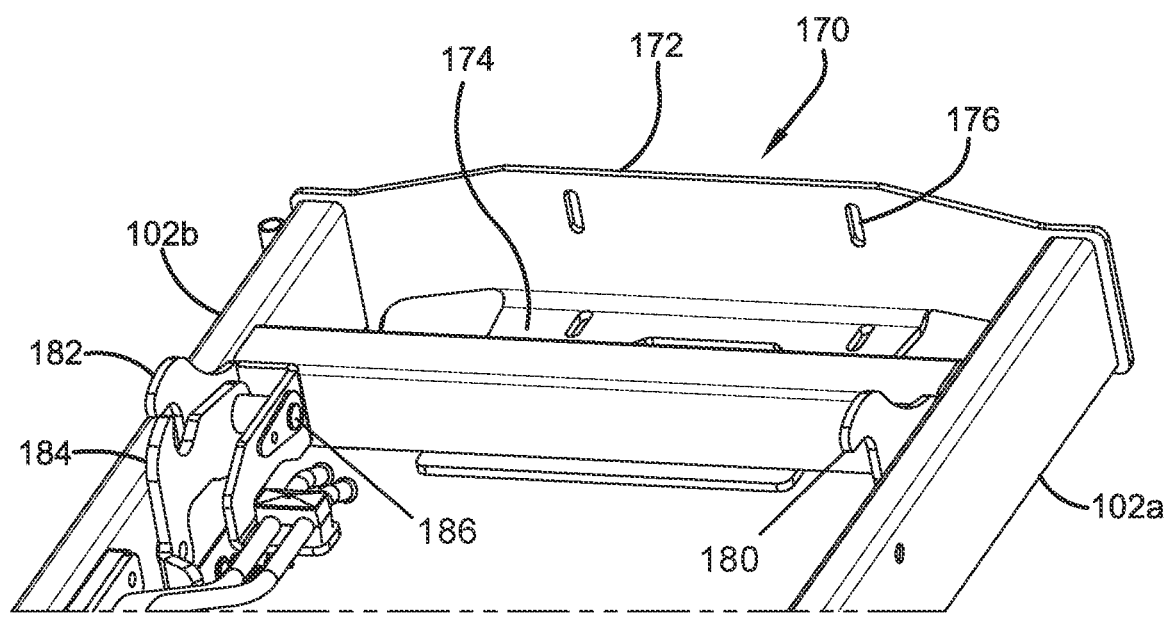
FIG. 8 is a detail view of the winch plate according to an exemplary embodiment of the present invention.

As particularly shown in the detail views of FIGS. 8 and 31, a back plate or winch plate 170 is attached to the elevated end 102e of the hoist frame 102 and is used to support the winch assembly 140. The winch plate 170 is a formed piece of sheet metal that replaces the single tube at the front of the previous type devices. The main advantage to the winch plate 170 compared to the previous type devices is that it allows the winch assembly 140 to be mounted in two planes verses a single plane as with the single tube design of the previous type devices. The winch plate 170 includes two perpendicular sides, a first side 172 and a second side 174, and each side 172, 174 has a set of oblong holes 176 for connecting to two respective perpendicular sides of the winch assembly 140. In this manner, the winch plate 170 supports the winch assembly 140 in two separate planes, providing greater securement of the winch assembly 140. Also, the winch plate 170 provides additional room for accommodating the swivel hook 146.

In front of the winch plate 170 are front body hold downs 180, 182 and a body lock 184. As an interchangeable body 104 is being drawn up with the cable 144, it encounters a winch stop switch 188 near the body hold down 182 (see FIG. 28) which sends a signal to the system indicating contact with the body 104 and thus discontinues electrical power, which thereby stops the winch motor 142, halting the forward advance of the body 104. The body lock 184 includes an engaging hook to retain the body 104 in a secure position. The front body hold down 180 is similar to front body hold down 182 but does not have a connecting hook and functions as a stop for halting forward motion. The body lock 184 is assembled with a removeable and greaseable shaft 186, which enables replacement of the body lock 184 in the event of damage, as compared with the previous type devices in which a corresponding component is welded. This allows for quick replacement in the field verses the welded-on method from the previous type devices which would require grinding, welding, and additional paint work when the lock part needs replacement. In addition, a quick release pin 330 holds body lock 184 in place, securing an interchangeable body 104 to hoist 100 while dumping.

Figure 9:
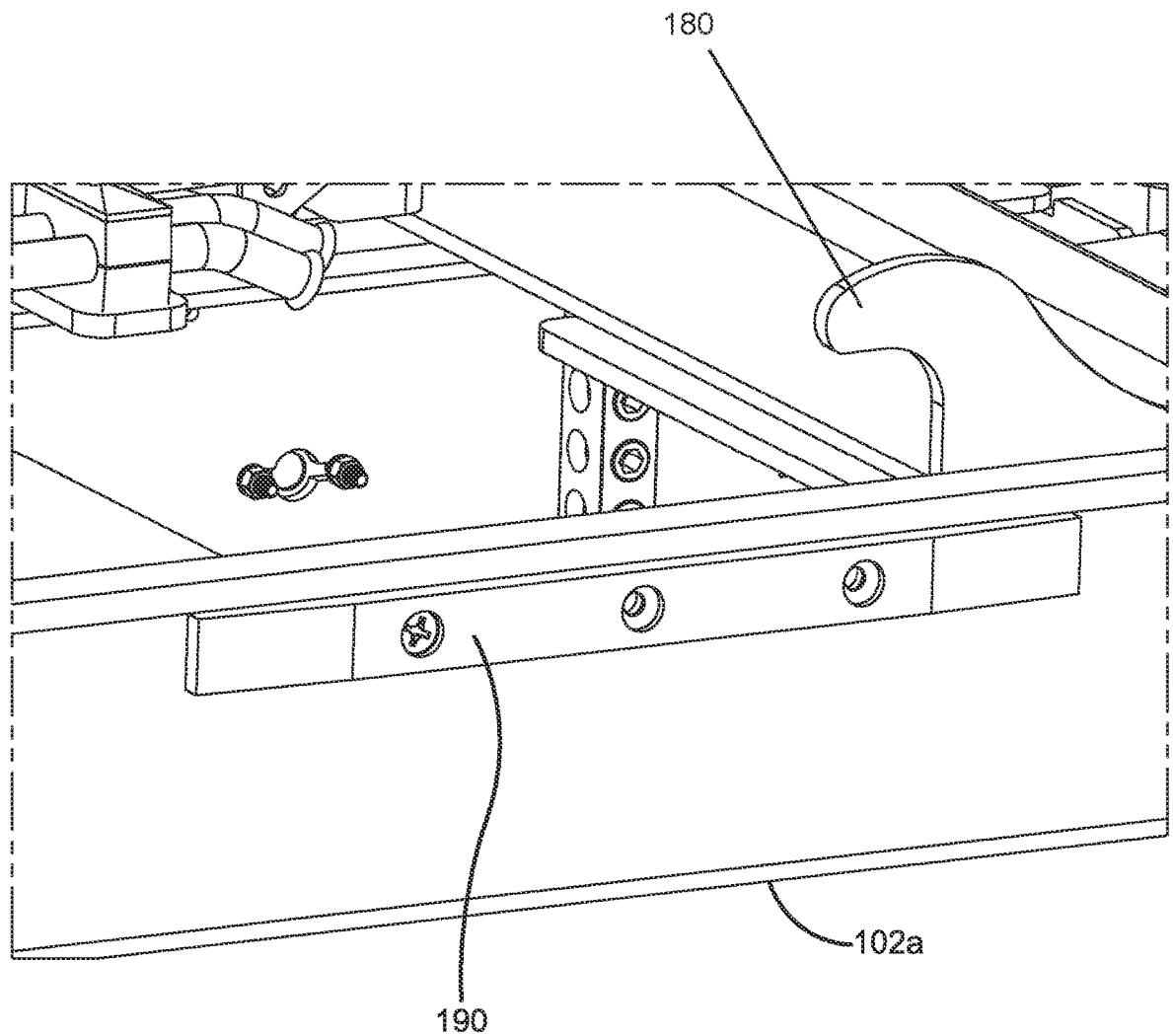
FIG. 9 is a detail view of a side body guide slide pad according to an exemplary embodiment of the present invention.
Figure 15:
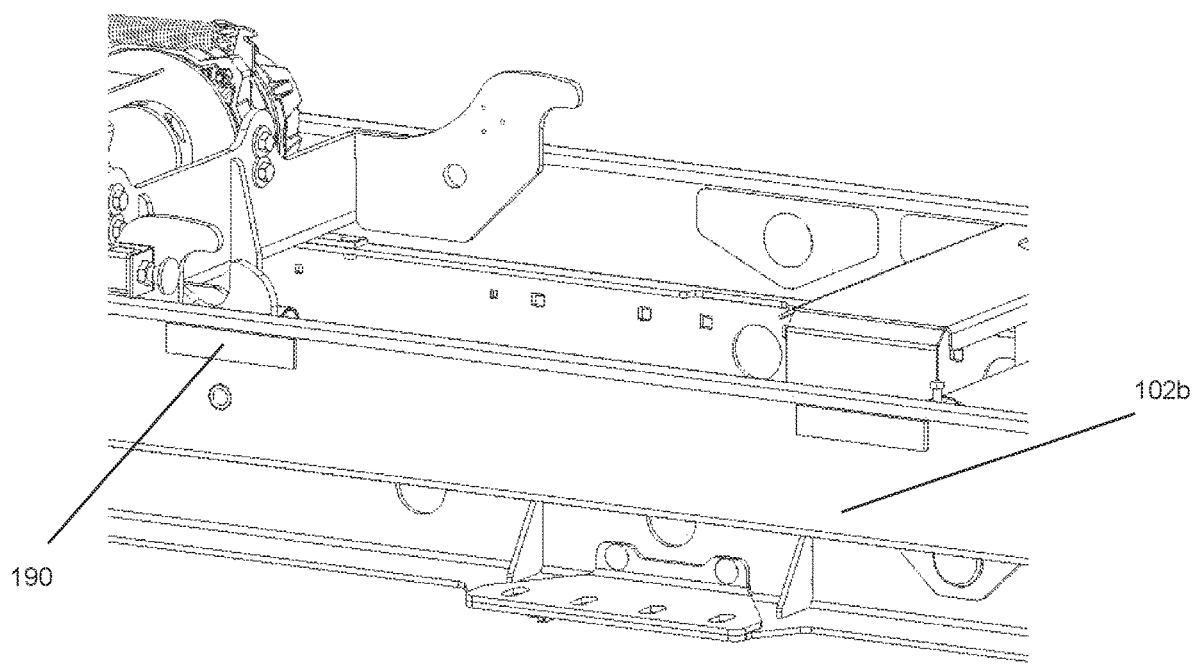
FIG. 15 is a detail view of a slide strip according to an exemplary embodiment of the present invention.

The detail views of FIGS. 9 and 15 shows particular details of a slide strip 190. There can be a slide strip 190 mounted to each of the parallel frame members 102a, 102b, preferably on an exterior side, facing outwardly away from the longitudinal axis of the hoist frame 102, to protect the parallel frame members 102a, 102b from destructive contact with the interchangeable body 104. The slide strip 190 is preferably a flat strip affixed to the frame members 102a, 102b. There can be a plurality of slide strips 190 mounted by welding or with screws having recessed heads onto the exterior sides each of the parallel frame members 102a, 102b in order to provide additional low friction surfaces.

In the preferred embodiment, the slide snips 190 are greaseless slide strips formed of a low friction material to support the interchangeable vehicle body during movement along the hoist. In the preferred embodiment, the slide strips 190 are formed of steel reducing wear and tear on the system but could also be made of Nylatron® or other polymer material. In particular, the slide strips 190 (and other Nylatron® and other polymer parts described herein) reduce metal-on-metal contact between the hoist system 100 and the interchangeable bodies 104, which can expose bare metal to the elements, causing rust, which can shorten the useful life of the hoist system 100. Also, the Nylatron® slide strips 190 can be replaced when worn out, further extending the useful life of the hoist system 100.

Figure 10:
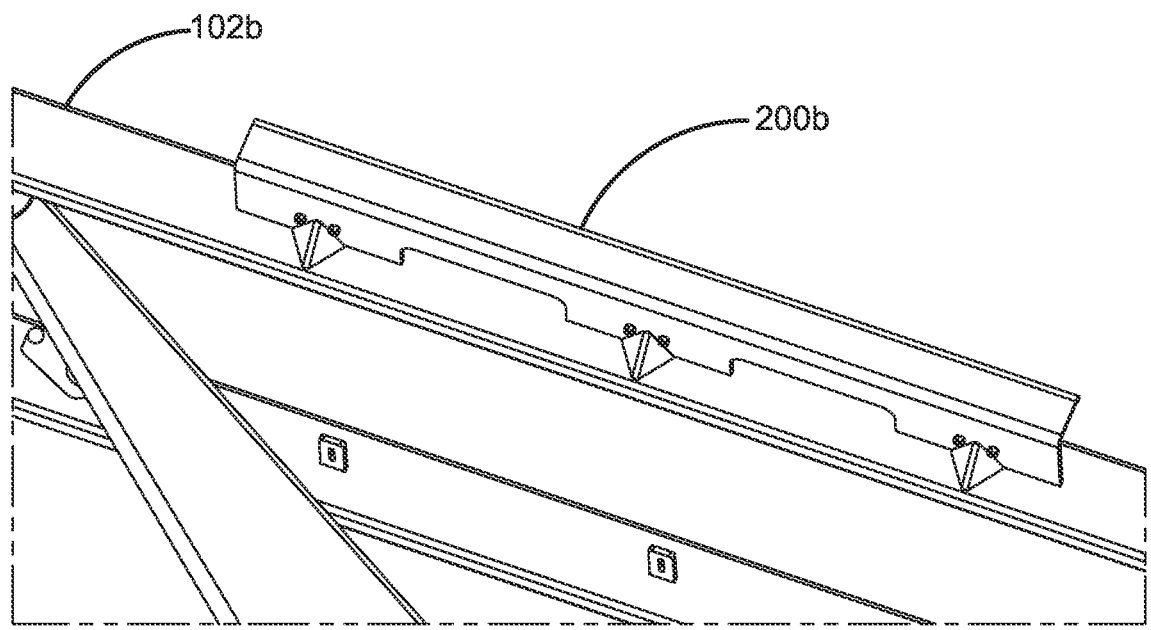
FIG. 10 is a detail view of an underside of a body hold down according to an exemplary embodiment of the present invention.
Figure 11:
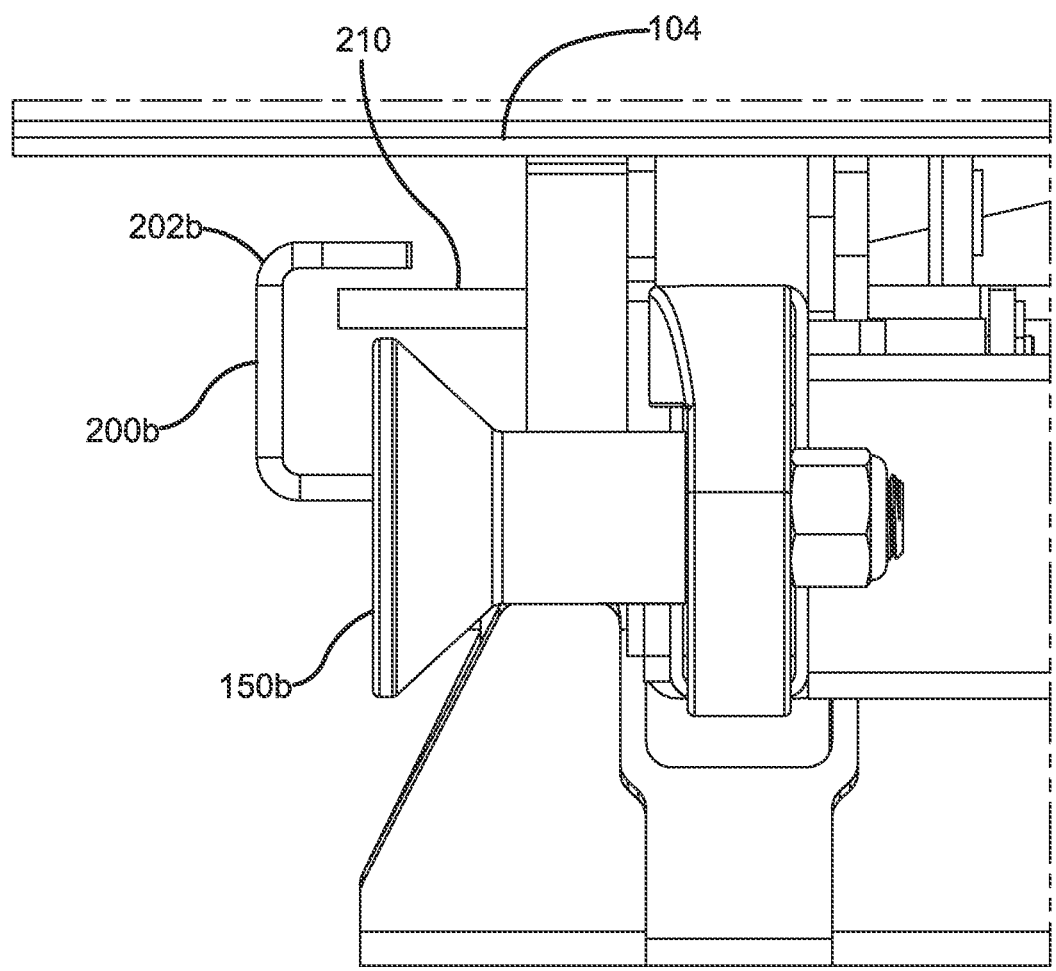
FIG. 11 is a rear view of the side channel features according to an exemplary embodiment of the present invention.
Figure 13:
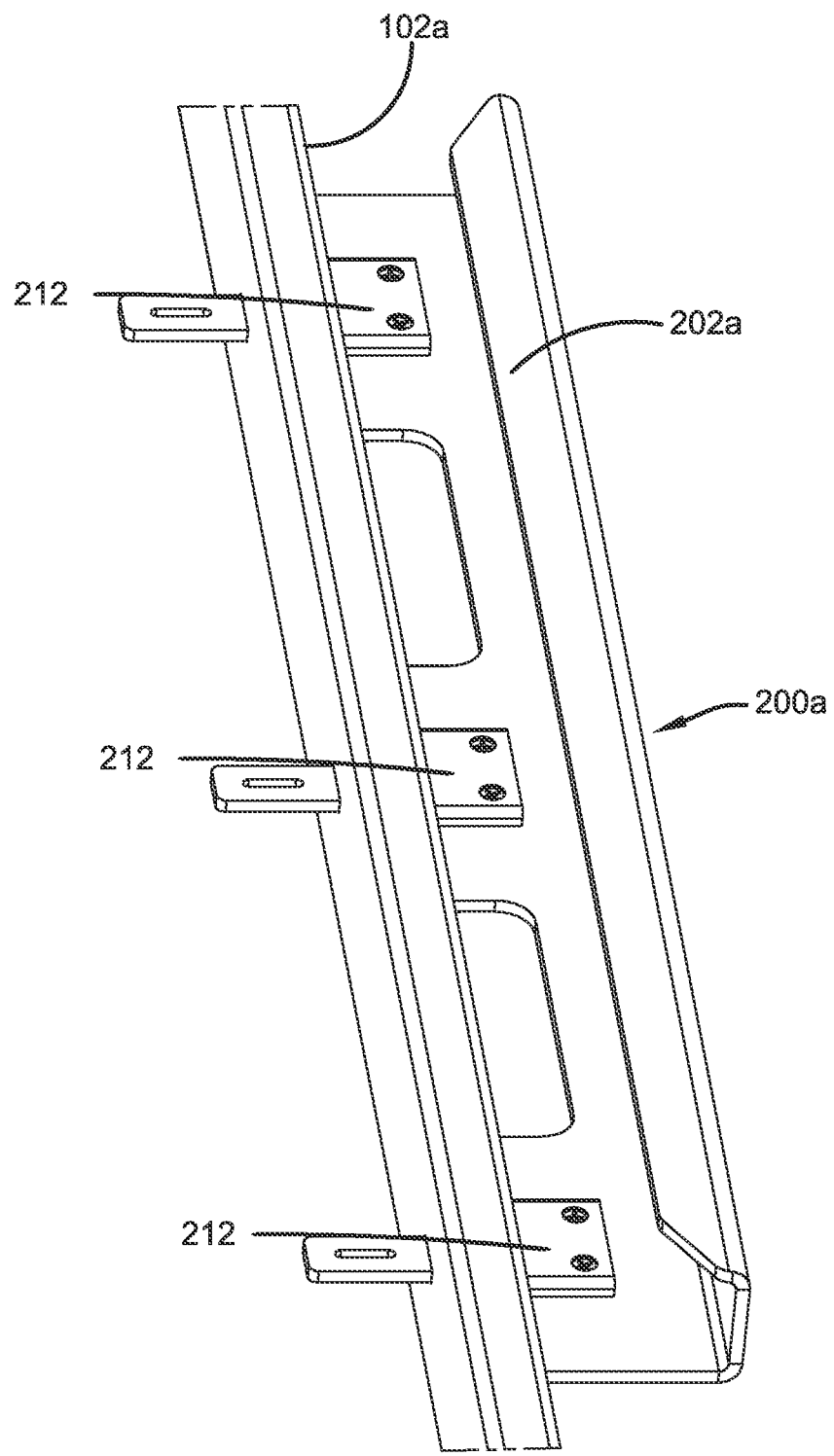
FIG. 13 is a detail view of a side rail according to an exemplary embodiment of the present invention.

FIGS. 2, 3, and the details and rear views of FIGS. 10, 11, and 13 show particular details of body hold downs in the form of side channels 200a, 200b. As shown, the side channel body hold downs 200a, 200b (or "universal hold downs" or "multi-lock system") are hooked structures having a generally C-shaped cross section having upper portions 202a, 202b configured to receive and retainably engage mating components 210 formed on an interchangeable body 104. Each of the body hold downs 200a, 200b are mounted to each of the respective parallel frame members 102a, 102b, preferably on the respective exterior sides, facing outwardly away from the longitudinal axis of the hoist frame 102. The C-shaped cross section with resulting upper portions 202a, 202b are sufficiently large to engage a variety of different sized mating components 210 associated with a variety of different sized interchangeable vehicle bodies 104, and thereby enable a variety of different sized interchangeable vehicle bodies to be used on the hoist.

As especially shown in FIG. 13, the side channels 200a, 200b cooperate with slide pads 212 in the form of metal brackets each having an upward-facing surface including a Nylatron® pad that are attached to the first and second parallel frame members 102a, 102b. Upon hoisting, the interchangeable body 104 rides within the body hold downs 200a, 200h, which keep the body 104 aligned and supported. The body 104 does not contact the body hold downs 200a, 200b but allows a clearance of approximately ⅛-inch, as shown in FIG. 11. When a body 104 is fully loaded, it rests upon the slide pads 212, which support the body 104 in the event of a rollover, thereby providing additional safety.

Figure 12:
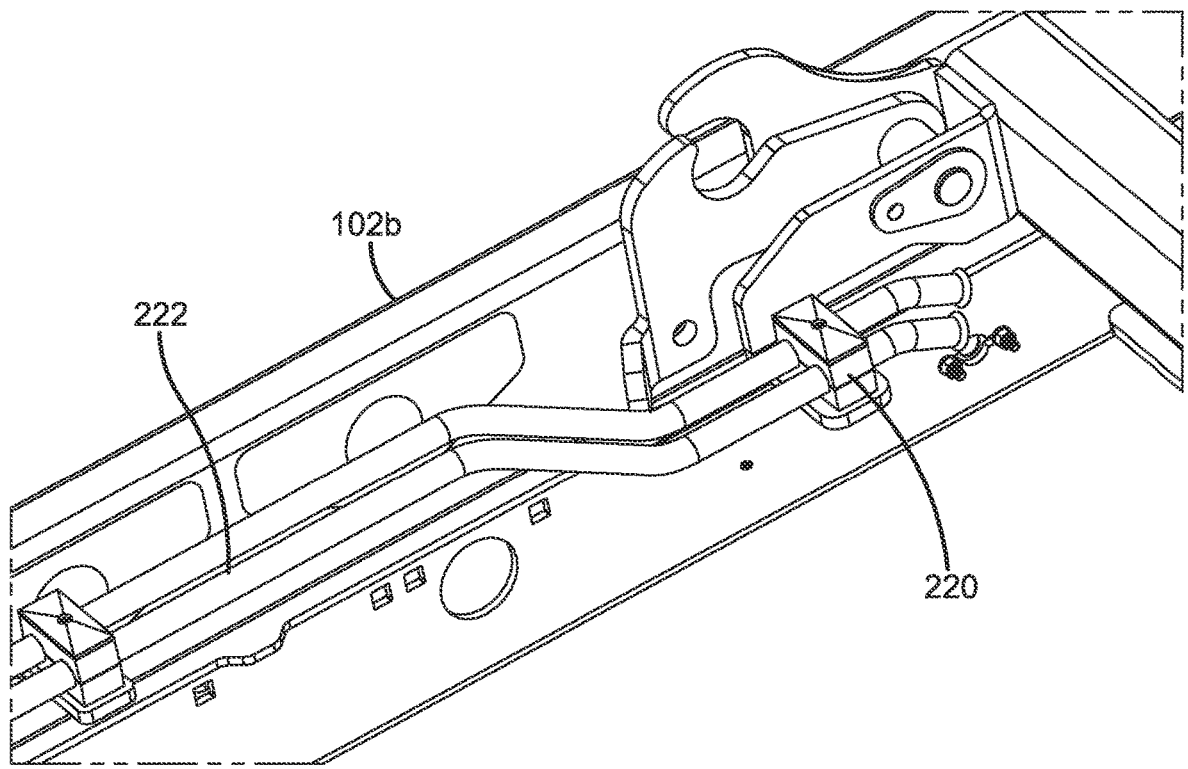
FIG. 12 is a detail view of a tubing support according to an exemplary embodiment of the present invention.

As shown in the detail views of FIG. 12, the frame members 102a, 102b can include a support section 220 that provides a tubing support for tubing 222, as can also be seen in FIG. 3. The tubing 222 provides hydraulic oil to the hydraulic winch motor 142, The tubing 222 can alternatively enclose wiring for an electrical winch motor. It is appreciated in the art that using a hydraulic winch motor is a lower volume option that is needed for certain applications because it has a much greater duty cycle. However, it is to be appreciated that other types of winch motors 142 such as electric motors can alternatively be employed without departing from the invention.

FIGS. 14-34 provide additional detail and/or alternate embodiments in accordance with the present invention. It is to be appreciated that like reference numerals refer to like elements in accordance with the embodiments described hereinabove.

Figure 14:
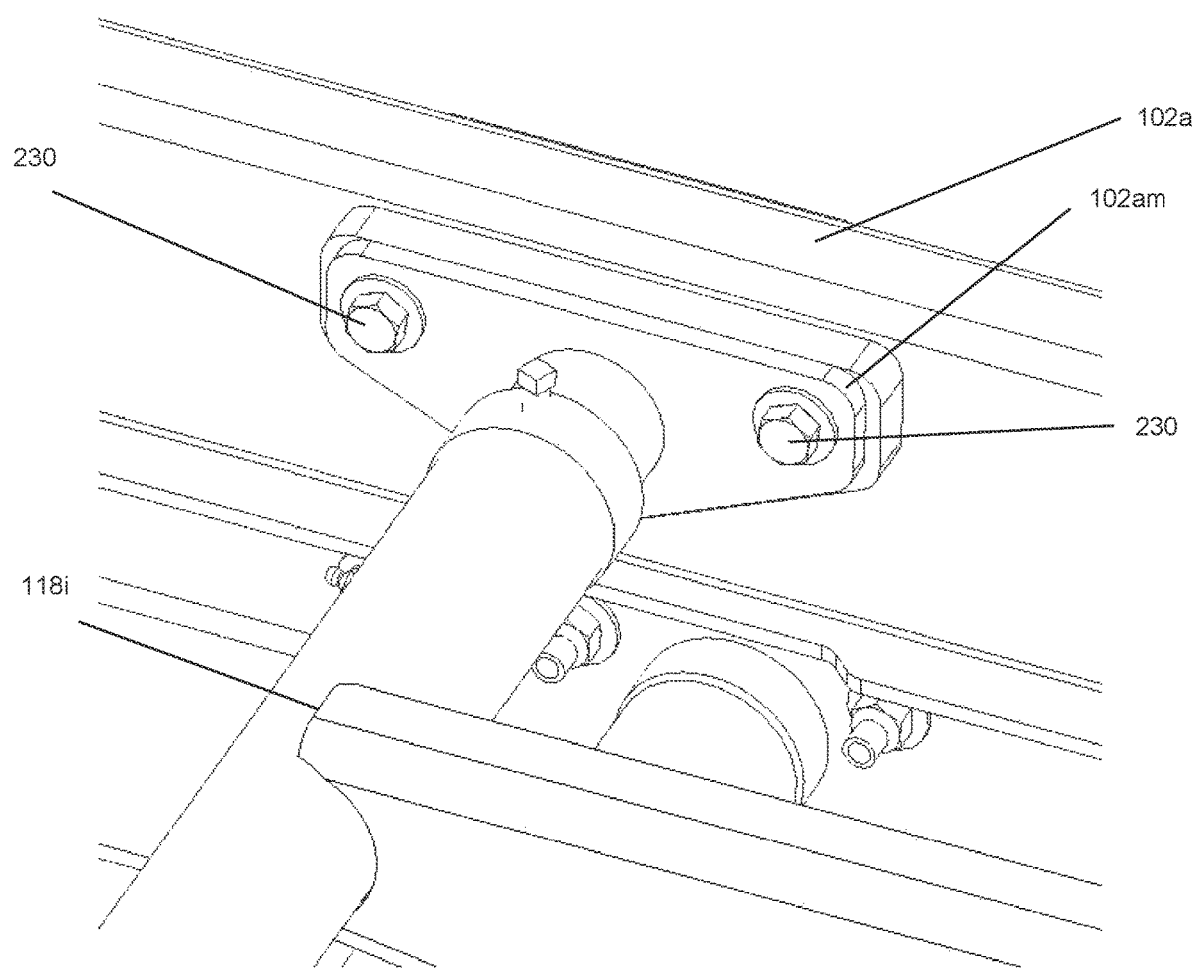
FIG. 14 is a detail view of a linkage connection bracket according to an exemplary embodiment of the present invention.

As depicted in FIG. 14 is a detail view of a connection bracket 102am for connecting the first pivot bar 118i to the first parallel frame member 102a of the hoist frame 102, Though not explicitly shown, it is to be appreciated that an identical connection bracket 102bm can be provided for connecting the first pivot bar 118i to the second parallel frame member 102b of the hoist frame 102, and similarly identical connection brackets 110am, 110bm can also be provided for connecting the second pivot bar 118ii to the first and second parallel subframe members 110a, 110b of the subframe 110, in accordance with the descriptions of the other embodiments described hereinabove. In this manner, a plurality of connection brackets 102am, 102bm, 110am, 110bm can be provided for securely bolting the first and second pivot bars 118i, 118ii to the subframe 110 and the hoist frame 102 using a pair of bolts 230 received in respective suitable bolt holes formed in the respective parallel frame members 102a, 102b, 110a, 110b, for enabling the connection brackets 102am, 102bm to be securely bolted thereto. In this manner, the connection brackets 102am, 102bm engage and support the linkage at respective positions along the subframe 110 and the hoist frame 102, thereby enabling a respective configuration of the hoist system 100.

Figure 16:
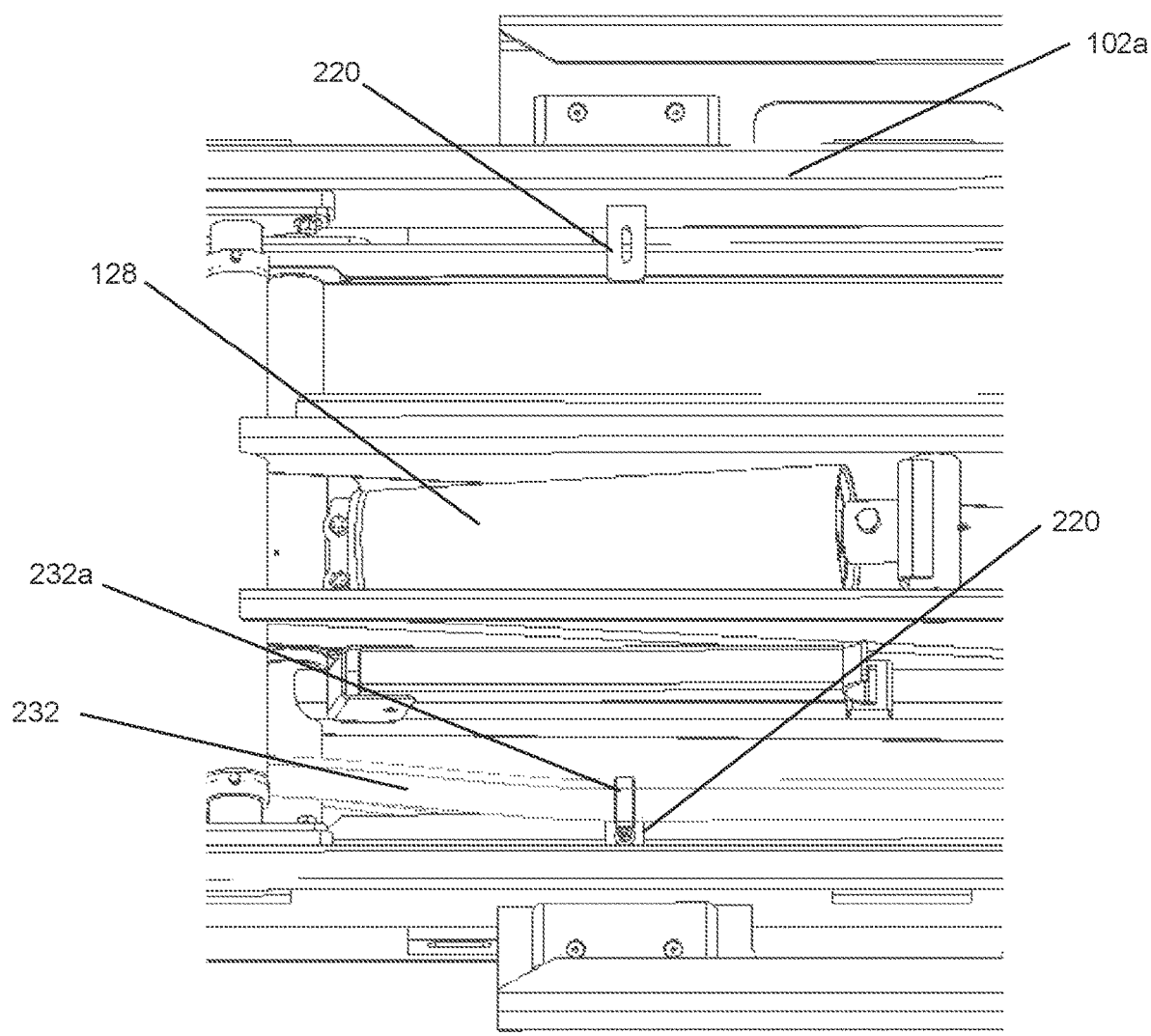
FIG. 16 is an overhead view of an alternative embodiment of a support section according to the present invention.

As shown in FIG. 16, the support section 220 can be provided for supporting for tubing 222 that provides hydraulic oil to a hydraulic winch motor of the winch assembly. The support section 220 can be connected to one of the frame members 102a, 102b or can span any other components perpendicular to the frame members 102a, 102b along the longitudinal extent of the hoist system 100. The support section 220 can include a flexible conduit 232 for encompassing wiring for an electrical winch motor. The flexible conduit 232 can be retained in place by a support structure 232a which can be secured to any stable surface on the hoist system 100. In an unillustrated alternate embodiment, the support section 220 can include a wire tray having flat, elongated securement surface 220a against one or more securing straps can be fastened for retaining the tubing 222. The securing straps can be a conventional "zip-tie" or any other suitable strap structure as would occur to those having skill in the art. The support section 220 can also include one or more additional flat, elongated securement surfaces formed perpendicularly to a mounting surface to provide additional protection for the tubing 222 on or more respective sides. The additional surface can include one or more holes for enabling passage of the securing straps, such as enabling the "zip-ties" to be threaded therethrough, for example.

As shown in FIGS. 17, 18, and 19, the pump plate cover 114c is provided to protect the pump from damage. The cover 114c can be made of metal or plastic or any other suitable material. The pump plate cover 114c is connected to the pump plate 114, or either of the parallel subframe members 110a, 110b, for protecting hydraulic and electrical components that power the system from damage. The pump plate cover 114c is essentially a flat top portion that can include a first adjoining side portion 114c-a that is slanted at an oblique angle and has a lip parallel to the flat top portion, to cover and protect a front side. The pump cover plate 114c also includes a second adjoining side portion 114c-b that is also slanted at a perpendicular angle to cover and protect a back side, opposite the front side, for substantially surrounding the hydraulic and electrical components.

As depicted in FIGS. 20 and 21, a pivotal connection can be provided for pivotally connecting the pivot end 102p of the hoist frame 102 to the subframe 110. The pivotal connection is defined by the first and second pivot pins 132a, 132b, about which the hoist frame 102 pivots during raising and lowering of the hoist. The pivot pins 132a, 132b are mounted on each respective side of the hoist frame 102, through bores formed in respective parallel frame members 102a, 102b. Mounting portions 116 can be formed directly onto the subframe 110 at both the front and back of the subframe. In this manner, the subframe 110 can include first and second parallel subframe members 110a, 110b having mounting portions 116 on each of the subframe members 110a, 110b. The mounting portions 116 include a series of mounting holes 116a for receiving bolts for fixedly connecting the subframe members 110a, 110b to the vehicle chassis 106 through the use of mounting brackets 114a, 114b. In this manner, the mounting portions 116 are formed directly onto the subframe members 110a, 110b with no involvement with the pump plate 114 or the hinge assembly 130 as specifically characterized in the embodiments hereinabove.

FIGS. 20 and 22-27 depict a fender mount 300 for mounting a fender assembly to the subframe 110. As shown, the fender mount 300 is generally rectangular structure formed of two perpendicular sides and welded to the first and second parallel frame members 110a, 110b of the subframe 110. The fender mount 300 includes front and back attachment channels 302, 304 to which the fender assembly is mounted. As shown in FIG. 20, there is preferably a pair of fender mounts 300 mounted to exterior sides of each of the first and second parallel frame members 110a, 110b of the subframe 110 at positions corresponding to the front and back of the rear wheels of the vehicle, for suitably mounting the fender assembly 312. Thus, the fender mount 300 are provided to secure the fender assembly to the respective parallel frame member 110a, 110b.

With continued reference to FIGS. 20 and 22-27, on each side of the vehicle, the pair of fender mounts 300 are for each securing a first or front connection 310f and a second or back connection 310b from the fender assembly to the respective parallel frame member 110a, 110b of the subframe 110. The fender assembly includes a fender 312 for substantially surrounding a vehicle tire and thereby preventing splashing (of water, snow, mud, etc.) onto the underside of the vehicle. The fender assembly also includes a plurality, preferably a pair, of connection assemblies for securing the fender 312 to the respective fender mount 300. Each connection assembly includes a support bar 314 that is mounted to the fender with a front flange 316f and a back flange 316b, where each flange 316f, 316b is formed onto the fender 312. (e.g., via molding of the like). The support bar 314 is attached to a coupling member 320 which is secured to one of the front or back attachment channels 302, 304 of the fender mount 320 with a bolt 322. In this manner, the tender 312 is attached to and supported by the subframe 110 via the front and back connections 310f, 310b. The two front and back attachment channels 302, 304 are suitably sized and spaced to enable a respective one of the front and back connections 310f, 310b to attach to the subframe 110 to accommodate a variety of different vehicle makes and models that have a wider or a narrower set. In the preferred embodiment, the fender 312 and fender mount 320 can be of the products sold by Fleet Engineers, Inc. of Muskegon, Michigan. However, any suitable alternative product could also be used without departing from the present invention.

As shown in FIGS. 28 and 29, a body hold down 182 in accordance with the embodiment described hereinabove is provided and includes an engaging hook (body lock) 184 for retaining the interchangeable body 104 in a secure position upon the hoist frame 102. The body lock 184 is assembled with a removeable and greaseable shaft 186, which enables removal and replacement of the body lock 184 in the event of damage. A winch stop switch 188 is provided near the body hold down 182 which signals contact with the body 104 and discontinues electrical power, which thereby stops the winch motor 142. A quick release pin 330 is mounted through one of the parallel frame members 102a, 102b of the frame 102 for securing the body lock 184 to the hoist frame 102. The quick release pin 330 includes a first end having a ball detent or a hole for receiving a cotter pin for retaining the body lock 184 to the hoist frame 102 and second end having a grippable handle for withdrawing the quick release pin 330 from the body lock 184 and the parallel frame member 102a, 102b of the frame 102.

As shown in FIG. 32A, the winch assembly 140 includes the winch motor 142 that feeds out the cable 144 in a direction that extends along the longitudinal axis of the hoist frame 102 to the pivot end 102p and connects to the hook 146, for raising the interchangeable body 104 onto the hoist frame 102. A winch cable tensioning component can include a lid 148a which can pivot along a first frame member 148b-1 which cooperates with a second frame member 148b-2 to hold down the cable 144 and thereby prevent the cable 144 from unraveling from the winch drum. Alternatively, as shown in FIG. 32B a stow hook component 148 can include a conventional loop for stowing the hook 146.

Numerous embodiments have been described herein. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

Having thus described the invention, it is now claimed:

1. A hoist system for raising and mounting an interchangeable vehicle body onto a vehicle chassis, comprising:
    a hoist frame comprising first and second parallel frame members, extending along a longitudinal axis of the hoist frame between an elevated end and a pivot end, for slidably, supporting the interchangeable vehicle body;
    a subframe comprising first and second parallel subframe members and having mounting portions on each of the subframe members, the mounting portions including a series of mounting holes for receiving bolts for fixedly connecting to the vehicle chassis;
    a pivotal connection for pivotally connecting the pivot end of the hoist frame to the subframe;
    a linkage for connecting the hoist frame to the subframe, wherein the linkage comprises a hinge joint member having an upper leaf member pivotally connected to a lower leaf member for raising the elevated end of the hoist frame, wherein the linkage further comprises a first pivot bar for moveably connecting the upper leaf member to the first and second parallel frame members of the hoist frame, and a second pivot bar for moveably connecting the lower leaf member to the first and second parallel subframe members;
    a plurality of connection brackets at bracket locations for securely bolting the first and second pivot bars to the subframe and the hoist frame, for engaging and supporting the linkage at respective positions along the subframe and the hoist frame, enabling a respective configuration of the hoist system; and
    a winch assembly, retained in the elevated end of the hoist frame and extending beyond the pivot end, for raising the interchangeable body onto the hoist frame.

2. The hoist system of claim 1, wherein at least one of the first and second parallel frame members further comprises at least one body hold down that functions as a stop for halting forward motion of the interchangeable vehicle body onto the hoist frame.

3. The hoist system of claim 1, wherein at least one of the first and second parallel frame members further comprises at least one greaseless slide pad formed of a low friction material to support the interchangeable vehicle body during movement along the hoist frame.

4. The hoist system of claim 1, wherein at least one of the first and second parallel frame members further comprises at least one greaseless slide strip, mounted along a side of the respective one of the first and second parallel frame members, for protecting against frictional damage.

5. The hoist system of claim 1, further comprising a hydraulic cylinder, connected to the subframe, for displacing the linkage to raise the elevated end of the hoist frame.

6. The hoist system of claim 1, further comprising a support section for supporting for tubing that provides hydraulic oil to a hydraulic winch motor or electrical wiring to an electrical motor of the winch assembly.

7. The hoist system of claim 6, wherein the support section comprises a flexible conduit for encompassing the electrical wiring, wherein the flexible conduit is retained in place by a support structure which can be secured to a stable surface on the hoist system.

8. The hoist system of claim 1, further comprising a pump plate cover, connected to one of the subframe or the pump plate, for protecting hydraulic and electrical components that power the hoist system from damage.

9. The hoist system of claim 8, wherein the pump plate cover further comprises a flat top portion with at least one adjoining side portion, for substantially surrounding the hydraulic and electrical components.

10. The hoist system of claim 8, wherein the at least one adjoining side portion comprises a first adjoining side portion slanted at an oblique angle and having a lip parallel to the flat top portion, to cover and protect a front side, and a second adjoining side portion slanted at a perpendicular angle to cover and protect a back side, opposite the front side, for substantially surrounding the hydraulic and electrical components.

11. The hoist system of claim 1, further comprising at least one fender mount, mounted to at least one of the first and second parallel frame members, for securing a fender assembly to the respective frame member.

12. The hoist system of claim 11, further comprising a pair of fender mounts mounted to exterior sides of each of the parallel frame members, for each securing a first connection and a second connection from the fender assembly to the respective parallel frame member.

13. The hoist system of claim 11, wherein the fender assembly comprises a fender for substantially surrounding a vehicle tire and at least one connection assembly for securing the fender to the respective at least one fender mount.

14. The hoist system of claim 1, further comprising a body lock including an engaging hook for retaining the interchangeable body in a secure position upon the hoist frame.

15. The hoist system of claim 14, wherein the body lock is assembled with a removeable and greaseable shaft, for enabling removal and replacement of the body lock in the event of damage.

16. The hoist system of claim 14, wherein the body lock comprises a winch stop switch for signaling contact with the interchangeable body and discontinuing electrical power for stopping the winch assembly.

17. The hoist system of claim 14, further comprising a quick release pin mounted through one of the parallel frame members for securing the body lock to the hoist frame.

18. The hoist system of claim 1, further comprising first and second pulleys provided at the pivot end and connected to respective ends of the first and second parallel frame members so as to face in an outward direction, away from the longitudinal axis of the hoist frame.

19. The hoist system of claim 18, wherein the first and second pulleys are greaseless rollers, for lowering frictional engagement of the interchangeable vehicle body onto the hoist.

20. The hoist system of claim 18, further comprising castings formed onto the respective ends of the first and second parallel frame members for connecting the first and second pulleys.

21. The hoist system of claim 1, further comprising a V-roller mounted between the first and second parallel frame members for slidably supporting a cable of the winch assembly.

22. The hoist system of claim 20, wherein the V-roller comprises a "V-shaped" profile having a tapered section in the middle of the V-roller with a narrower diameter than diameters at the ends of the V-roller.

23. The hoist system of claim 1, further comprising at least one side channel body hold down mounted to a respective parallel frame member and configured to receive and retainably engage mating components formed on the interchangeable body.

24. The hoist system of claim 23, comprising a pair of the body hold downs mounted to respective exterior sides of each of the respective parallel frame members, facing outwardly away from the longitudinal axis of the hoist frame.

25. The hoist system of claim 24, wherein the side channel body hold downs are hooked structures having a generally C-shaped cross section and having upper portions configured to receive and retainably engage the mating components formed on the interchangeable body.

26. The hoist system of claim 1, further comprising a winch plate attached to the elevated end of the hoist frame to support the winch assembly, including first and second perpendicular sides thereby mounting the winch assembly in two planes, providing securement of the winch assembly.

27. The hoist system of claim 1, wherein the winch assembly comprises a winch motor that feeds out a cable in a direction that extends along the longitudinal axis of the hoist frame to the pivot end and connects to a hook for raising the interchangeable body onto the hoist frame.

28. The hoist system of claim 27, wherein the winch assembly further comprises a winch cable tensioning component for preventing the cable of the winch assembly from unraveling.

29. The hoist system of claim 1, further comprising at least one mounting bracket for connecting the subframe to the vehicle chassis, wherein the mounting bracket is formed integrally with the subframe and includes at least one mounting portion that engage the vehicle chassis.

30. The hoist system of claim 29, wherein the at least one mounting portion includes a plurality of mounting holes for receiving bolts to enable the mounting bracket and thus the subframe to be bolted to the vehicle chassis.

* * * * *